(12) United States Patent
Nitta et al.

(10) Patent No.: US 8,587,658 B2
(45) Date of Patent: Nov. 19, 2013

(54) IMAGING DEVICE, IMAGE DISPLAY DEVICE, AND PROGRAM WITH INTRUDING OBJECT DETECTION

(75) Inventors: Keiichi Nitta, Kawasaki (JP); Yuko Hattori, Tokyo (JP); Go Watanabe, Narashino (JP); Hiroyuki Tomita, Yokohama (JP); Hideo Hoshuyama, Kawaski (JP); Kenji Suzuki, Kawasaki (JP); Saeko Samejima, Tokyo (JP); Mikiya Tanaka, Chigasaki (JP); Setsu Mitsuhashi, Tokyo (JP); Takeshi Nishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 810 days.

(21) Appl. No.: 12/451,727

(22) PCT Filed: Jun. 5, 2008

(86) PCT No.: PCT/JP2008/060356
§ 371 (c)(1),
(2), (4) Date: Dec. 22, 2009

(87) PCT Pub. No.: WO2008/149925
PCT Pub. Date: Dec. 11, 2008

(65) Prior Publication Data
US 2010/0128138 A1  May 27, 2010

(30) Foreign Application Priority Data
Jun. 8, 2007  (JP) .................. 2007-153169

(51) Int. Cl.
*H04N 7/18* (2006.01)
*H04N 5/225* (2006.01)
*G06K 9/00* (2006.01)

(52) U.S. Cl.
USPC ............ 348/152; 348/143; 348/169; 382/103

(58) Field of Classification Search
USPC ............... 348/152–156, 169–172, 25–30, 348/208–208.99, 143–160; 382/103, 382/115–118
See application file for complete search history.

(56) References Cited

U.S. PATENT DOCUMENTS 6,088,468 A * 7/2000 Ito et al. .................. 382/103
6,744,461 B1 * 6/2004 Wada et al. ............... 348/143
(Continued)

FOREIGN PATENT DOCUMENTS

JP A-6-30374  2/1994
JP A 2004-297177  10/2004
(Continued)

OTHER PUBLICATIONS

International Search Report for International Application No. PCT/JP2008/060356, issued Sep. 2, 2008.
(Continued)

*Primary Examiner* — Chia-Wei A Chen
(74) *Attorney, Agent, or Firm* — Oliff & Berridge, PLC

(57) ABSTRACT

An imaging device includes a main photography means for photographing a photographic subject and acquires a photographic image, a preparatory image acquisition means for performing preparatory photography before or after the main photography means acquires the photographic image and acquiring preparatory images, a photographic information acquisition means for acquiring photographic information related to a circumstance of photography when the preparatory images are acquired by the preparatory image acquisition means, and a recording means for recording the photographic information and the photographic image upon a recording medium in mutual correlation.

10 Claims, 12 Drawing Sheets

(56) References Cited

U.S. PATENT DOCUMENTS

| | | | |
|---|---|---|---|
| 6,765,608 B1* | 7/2004 | Himeda et al. | 348/211.5 |
| 7,038,699 B2* | 5/2006 | Sato et al. | 345/633 |
| 7,218,342 B2* | 5/2007 | Kobayashi et al. | 348/211.8 |
| 7,385,626 B2* | 6/2008 | Aggarwal et al. | 348/143 |
| 7,423,667 B2* | 9/2008 | Hayasaka | 348/143 |
| 7,526,102 B2* | 4/2009 | Ozer | 382/103 |
| 7,596,240 B2* | 9/2009 | Ito et al. | 382/103 |
| 8,004,563 B2* | 8/2011 | Talmon et al. | 348/155 |
| 2003/0020808 A1* | 1/2003 | Luke et al. | 348/47 |
| 2003/0227555 A1* | 12/2003 | Kobayashi et al. | 348/231.6 |
| 2004/0119819 A1* | 6/2004 | Aggarwal et al. | 348/143 |
| 2005/0018879 A1* | 1/2005 | Ito et al. | 382/103 |
| 2005/0068437 A1* | 3/2005 | Hayasaka | 348/294 |
| 2005/0117023 A1* | 6/2005 | Seo | 348/207.99 |
| 2005/0157169 A1* | 7/2005 | Brodsky et al. | 348/143 |
| 2005/0185058 A1* | 8/2005 | Sablak | 348/208.99 |
| 2006/0274960 A1 | 12/2006 | Tamaru | |
| 2008/0043121 A1* | 2/2008 | Prilutsky et al. | 348/239 |
| 2008/0143820 A1* | 6/2008 | Peterson | 348/36 |
| 2008/0240499 A1* | 10/2008 | Porikli et al. | 382/103 |
| 2010/0013917 A1* | 1/2010 | Hanna et al. | 348/143 |

FOREIGN PATENT DOCUMENTS

| | | |
|---|---|---|
| JP | A-2004-297754 | 10/2004 |
| JP | A-2005-201995 | 7/2005 |
| JP | A-2006-54523 | 2/2006 |
| JP | A-2006-163496 | 6/2006 |
| JP | A-2006-166077 | 6/2006 |
| JP | A-2006-203600 | 8/2006 |
| JP | A-2007-19678 | 1/2007 |
| JP | A-2007-142702 | 6/2007 |

OTHER PUBLICATIONS

Notification of Reasons for Refusal issued Nov. 13, 2012 in Japanese Patent Application No. 2009-517895 (with translation).

* cited by examiner

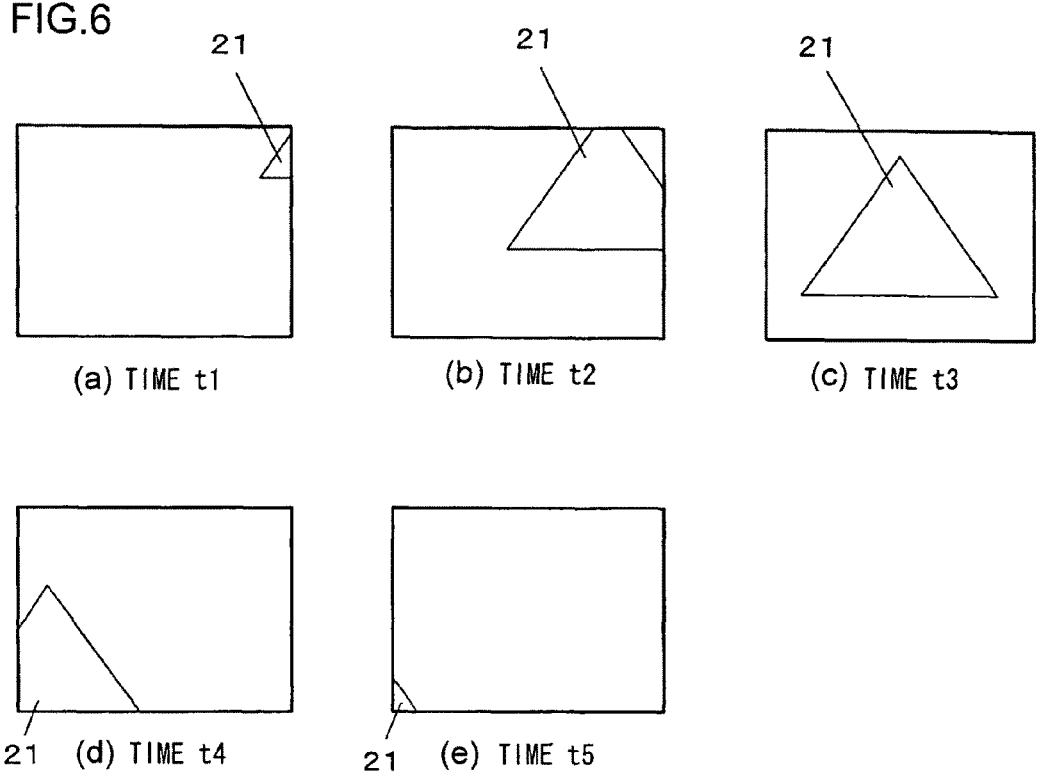
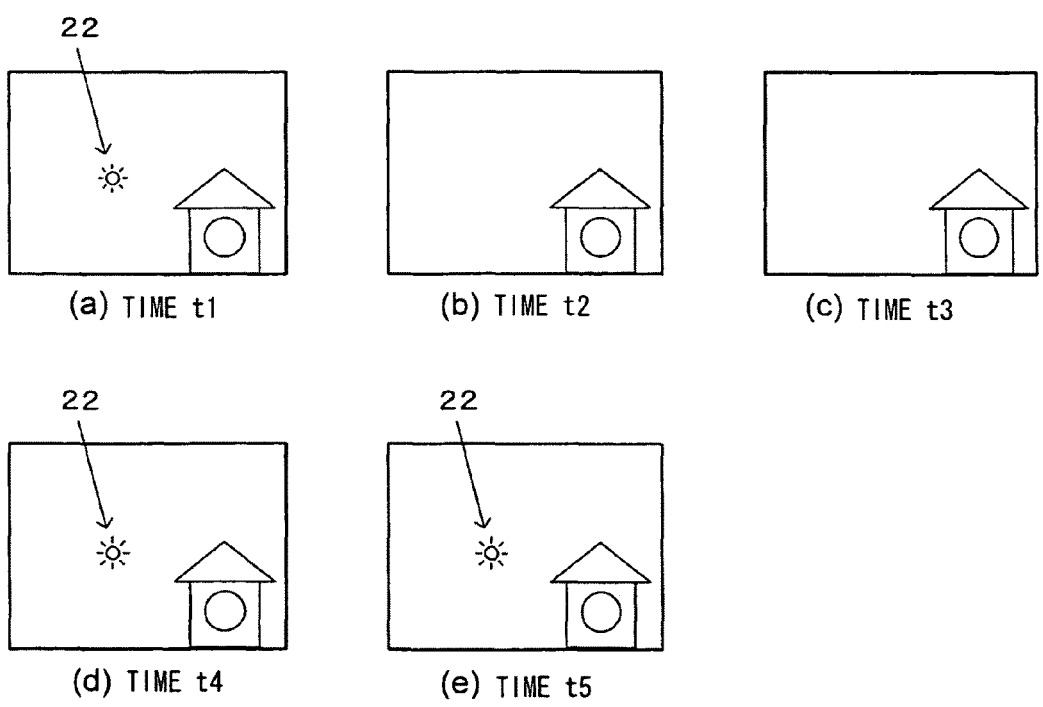

(a) (b) (c)

(a) (b) (c)

(a) (b) (c)

(a) (b) (c)

(a) (b) (c)

(a) (b)

(a) (b) (c)

IMAGING DEVICE, IMAGE DISPLAY DEVICE, AND PROGRAM WITH INTRUDING OBJECT DETECTION

TECHNICAL FIELD

The present invention relates to an imaging device, to an image display device, and to a program.

BACKGROUND ART

As a digital type imaging device that acquires photographic image data using an imaging element, and that performs photography by recording this acquired photographic image data, there is a known type in the prior art that displays an image of the photographic subject before photography as a through image (refer to Patent Document #1).
Patent Document #1: Japanese Laid-Open Patent Publication 2005-201995.

DISCLOSURE OF THE INVENTION

Problems to be Solved by the Invention

With a prior art imaging device such as that disclosed in Patent Document #1, the through image is of a type that can be utilized by the photographer for checking the photo composition. The object of the present invention is to utilize the information obtained when acquiring the through image for the processing of the main photography, which is performed separately from the photography of the through image, or the like. Moreover, another object of the present invention is, when acquiring the through image, to obtain information that may be utilized during replay or the like.

Means for Solving the Problems

The imaging device according to a 1st aspect of the present invention comprises: a main photography means for photographing a photographic subject and acquires a photographic image; a preparatory image acquisition means for performing preparatory photography before or after the main photography means acquires the photographic image and acquiring preparatory images; a photographic information acquisition means for acquiring photographic information related to a circumstance of photography when the preparatory images are acquired by the preparatory image acquisition means; and a recording means for recording the photographic information and the photographic image upon a recording medium in mutual correlation.

According to a 2nd aspect of the present invention, in the imaging device of the 1st aspect, it is preferable that: on the basis of a plurality of the preparatory images acquired by the preparatory image acquisition means as time elapses, the photographic information acquisition means acquires photographic information specifying a state of the photographic subject in the preparatory images; and the recording means records the photographic information along with time elapse.

According to a 3rd aspect of the present invention, in the imaging device of the 2nd aspect, it is more preferable that the photographic information acquisition means acquires the photographic information on the basis of at least one of movement and blinking state of the photographic subject in the preparatory images.

According to a 4th aspect of the present invention, the imaging device of the 2nd or 3rd aspect may further comprise a replay display means for, on the basis of the photographic image and the photographic information recorded upon the recording medium, displaying a replay image according to the photographic image in which a state of the photographic subject in the preparatory images is expressed.

According to a 5th aspect of the present invention, in the imaging device of the 4th aspect, it is desirable that: the photographic information recorded upon the recording medium specifies the movement of the photographic subject in the preparatory images; and the replay display means displays the replay image while sliding the position of the photographic subject in the replay image according to the movement of the photographic subject specified by the photographic information.

According to a 6th aspect of the present invention, in the imaging device of the 4th aspect, it may be configured that: the photographic information recorded upon the recording medium specifies the movement of the photographic subject in the preparatory images; and the replay display means displays the replay image while changing lengths of bright spots in the replay image according to the movement of the photographic subject specified by the photographic information.

According to a 7th aspect of the present invention, in the imaging device of the 4th aspect, it may also be configured that: the photographic information recorded upon the recording medium specifies the blinking state of the photographic subject in the preparatory images; and the replay display means displays the replay image while blinking a portion of the replay image according to the blinking state of the photographic subject specified by the photographic information.

According to an 8th aspect of the present invention, in the imaging device of the 4th aspect, it can be configured that: the photographic information recorded upon the recording medium specifies the movement of the photographic subject in the preparatory images; and the replay display means displays the photographic subject in each of a plurality of different positions in the replay image, according to the movement of the photographic subject specified by the photographic information.

According to a 9th aspect of the present invention, in the imaging device of the 4th aspect, it may be configured that: the photographic information recorded upon the recording medium specifies the movement of the photographic subject in the preparatory images; and, on the basis of the movement of the photographic subject specified by the photographic information, the replay display means decides whether or not the photographic subject is shaken in the photographic image, and corrects shake of the photographic subject in the replay image if it has been decided to be shaken.

According to a 10th aspect of the present invention, in the imaging device of the 1st aspect, the photographic information acquisition means may acquire, as the photographic information, an image made by cutting out a portion of the preparatory images.

According to an 11th aspect of the present invention, the imaging device of the 10th aspect may further comprise a replay display means for, on the basis of the photographic image and the photographic information recorded upon the recording medium, displaying a replay image according to the photographic image in which a state of the photographic subject in the preparatory images is expressed. In this imaging device, it is preferable that: the photographic information acquisition means further acquires, as the photographic information, information that specifies oscillatory movement of the photographic subject in the preparatory images; and the replay display means displays the replay image while changing at least one of the position and the shape of the photographic subject in the replay image according to the oscillatory movement of the photographic subject specified by the photographic information, and also displays a background on the basis of the image made by cutting out a portion of the preparatory images, when at least one of the position and the shape of the photographic subject have been changed.

According to a 12th aspect of the present invention, the imaging device of the 10th aspect may further comprise a replay display means for displaying a replay image in which a portion of the photographic image has been replaced by the image made by cutting out a portion of the preparatory images.

According to a 13th aspect of the present invention, in the imaging device of the 1st aspect, the photographic information acquisition means can acquire the photographic information that specifies a setting change during acquisition of the preparatory images, on the basis of change of at least one of a focal length, an aperture, and a focal adjustment state when the preparatory images are acquired by the preparatory image acquisition means.

According to a 14th aspect of the present invention, the imaging device of the 13th aspect may further comprise a replay display means for, on the basis of the photographic image and the photographic information recorded upon the recording medium, displaying a replay image according to the photographic image in which setting change during acquisition of the preparatory images is expressed.

According to a 15th aspect of the present invention, in the imaging device of the 14th aspect, it is desirable that: the photographic information recorded upon the recording medium specifies the change of focal length when the preparatory images are acquired; and the replay display means displays the replay image while changing its magnification ratio according to the change of focal length specified by the photographic information.

According to a 16th aspect of the present invention, in the imaging device of the 14th aspect, it may be configured that: the photographic information recorded upon the recording medium specifies the change of aperture when the preparatory images are acquired; and the replay display means displays the replay image while changing the blurring state of its background portion according to the change of aperture specified by the photographic information.

According to a 17th aspect of the present invention, in the imaging device of the 14th aspect, it may also be configured that: the photographic information recorded upon the recording medium specifies the change of focal adjustment state when the preparatory images are acquired; and the replay display means displays the replay image while changing its blurring state according to the change of focal adjustment state specified by the photographic information.

According to a 18th aspect of the present invention, the imaging device of the 1st aspect may further comprises: an intruding object detection means for, when preparatory images have been acquired by the preparatory image acquisition means before acquisition of the photographic image by the main photography means, detecting an intruding object into a photographic field on the basis of the photographic information that is acquired by the photographic information acquisition means and specifies movement of the photographic subject; and a control means for permitting or prohibiting photography by the main photographic means, according to the result of intruding object detection by the intruding object detection means.

According to a 19th aspect of the present invention, in the imaging device of the 18th aspect, it is preferable that the control means permits or prohibits photography by the main photographic means, on the basis of an intrusion direction into the photographic field or a size of the intruding object.

According to a 20th aspect of the present invention, in the imaging device of the 19th aspect, it is more preferable that: a movement detection means for detecting movement of the imaging device is further included; and the control means permits photography by the main photographic means, for an intrusion direction of the intruding object into the photographic field due to the movement of the imaging device detected by the movement detection means.

According to a 21st aspect of the present invention, in the imaging device of any one of the 18th through 20th aspects, it is desirable that the recording means further records the result of detection of the intruding object by the intruding object detection means upon the recording medium in correlation with the photographic image.

According to a 22nd aspect of the present invention, the imaging device of the 1st aspect may further comprise an intruding object detection means for, when preparatory images have been acquired by the preparatory image acquisition means, detecting an intruding object into a photographic field on the basis of the photographic information that is acquired by the photographic information acquisition means and specifies movement of the photographic subject. In this imaging device, it is preferred that the recording means records the result of detection of the intruding object by the intruding object detection means upon the recording medium in correlation with the photographic image.

According to a 23rd aspect of the present invention, in the imaging device of the 21st or 22nd aspect, it is desirable that the recording means eliminates the result of detection of the intruding object from a subject to be recorded, if the intruding object has shifted out of the photographic field before the main photography means performs photography.

According to a 24th aspect of the present invention, the imaging device of the 1st aspect may further comprise a photographic condition setting means for setting photographic conditions when the main photographic means performs photography on the basis of the photographic information described above.

According to a 25th aspect of the present invention, the imaging device of any one of the 18th through 23rd aspects may further comprise: an extraction and replay means for, from among the photographic images recorded upon the recording medium, extracting and replaying a photographic image in which the intruding object into the photographic field is present; and a deletion image confirmation screen display means for displaying a screen for confirmation as to whether or not the photographic image replayed by the extraction and replay means is to be deleted from the recording medium.

The image display device according to a 26th aspect of the present invention displays a replay image according to the photographic image in which a circumstance of photography when the preparatory images are acquired is expressed, on the basis of the photographic image and the photographic information recorded upon the recording medium by the imaging device of any one of the 1st through 17th aspects.

The image display device according to a 27th aspect of the present invention extracts and replays, from among the photographic images recorded upon the recording medium by the imaging device of any one of the 18th through 23rd aspects, a photographic image in which the intruding object into the photographic field is present, and displays a screen for confirmation as to whether or not the replayed photographic image is to be deleted from the recording medium.

A computer-readable program according to a 28th aspect of the present invention causes a computer to execute: a step of reading out from the recording medium the photographic image and the photographic information recorded upon the recording medium by the imaging device of any one of the 1st through 17th aspects, and a step of, on the basis of the photographic image and the photographic information read out from the recording medium, displaying upon a screen a replay image according to the photographic image in which a circumstance of photography when the preparatory images are acquired is expressed.

A computer-readable program according to a 29th aspect of the present invention causes a computer to execute: a step of extracting and replaying, from among the photographic images recorded upon the recording medium by the imaging device of any one of the 18th through 23rd aspects, a photographic image in which the intruding object into the photographic field is present; and a step of displaying a screen for confirmation as to whether or not the replayed photographic image is to be deleted from the recording medium.

Advantageous Effect of the Invention

According to the present invention, the information obtained during acquisition of the through image can be utilized for processing such as main photography, which is performed separately from photography of the through image, or the like. Moreover, when acquiring the through image, it is possible to obtain information that is utilized during replay or the like.

BRIEF DESCRIPTION OF THE DRAWINGS

FIG. 6 is a figure showing an example of a through image when calculating a movement vector;

FIG. 7 is a figure showing an example of a through image when acquiring blink information;

BEST MODE FOR CARRYING OUT THE INVENTION

1. Structure

Figure 1:
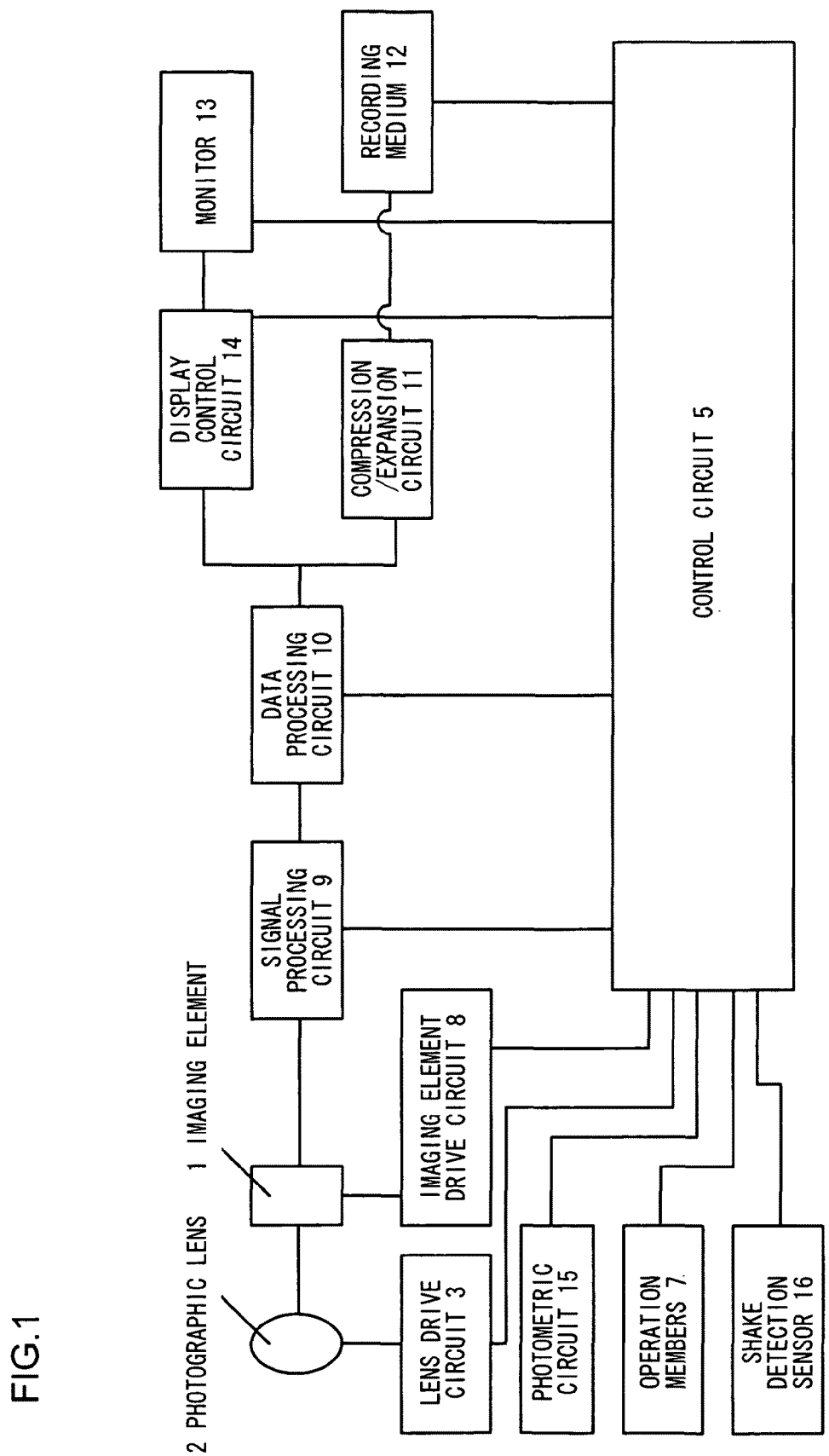
FIG. 1 is a block diagram showing an example of the structure of an imaging device.

A preferred embodiment for implementation of the present invention will now be explained with reference to the following drawings. FIG. 1 is a block diagram showing an example of the structure of an imaging device according to an embodiment of the present invention. The imaging device in FIG. 1 includes an imaging element 1, a photographic lens 2, a lens drive circuit 3, a control circuit 5, operation members 7, an imaging element drive circuit 8, a signal processing circuit 9, a data processing circuit 10, a compression/expansion circuit 11, a monitor 13, a display control circuit 14, a photometric circuit 15, and a shake detection sensor 16, and also is provided with a recording medium 12.

The recording medium 12 consists of a memory card, a compact hard disk, or an optical disk such as a DVD etc. or the like. It should be understood that this recording medium 12 could be one that is housed within the imaging device, or could also be one that is fittable and detachable. Moreover, it could be one that is provided on the exterior of the imaging device. In this case, the recording medium 12 and the imaging device would be electrically connected together via a cable or via wireless.

The photographic lens 2 consists of a plurality of lens groups that make up a photographic optical system, and that form an image of the photographic subject upon a photographic image surface of the imaging element 1. This photographic lens 2 includes a focusing lens, not shown in the figures. This focusing lens is driven forwards and backwards along the direction of the optical axis by the lens drive circuit 3. Due to this, the focal adjustment state of the photographic lens 2 changes, so that focus adjustment of the photographic lens 2 is performed. Moreover, the photographic lens 2 includes a zoom lens, not shown in the figures. This zoom lens is driven forwards and backwards along the direction of the optical axis by the lens drive circuit 3. Due to this, the focal length of the photographic lens 2 changes, so that zoom adjustment of the photographic lens 2 is performed.

Furthermore, the photographic lens 2 includes a lens for shake correction, not shown in the figures. On the basis of the output of the shake detection sensor 16, this lens for shake correction is driven by the lens drive circuit 3 in a direction orthogonal to the optical axis of the photographic lens 2. Due to this, the position where the image of the photographic subject is imaged upon the imaging element 1 is shifted in a direction to cancel out the shaking of the imaging device, so that shake correction is performed. By performing this type of shake correction, the imaging device is able to perform photography while alleviating shaking of it by the photographer.

It should be understood that, instead of driving the lens for shake correction in the manner described above, it would also be acceptable to arrange to perform shake correction by using a variable apical angle prism and changing its apical angle, so that the position where the image of the photographic subject is imaged upon the imaging element 1 is shifted in the direction to cancel out the shaking of the imaging device. Or, it would also be acceptable to arrange to perform this shake correction by driving the imaging element 1 in a direction orthogonal to the optical axis of the photographic lens 1, so as to cancel out shaking of the imaging device.

The imaging element 1 accumulates electric charge upon each of its pixels on the basis of the image of the photographic subject imaged by the photographic lens 2, and outputs an electrical signal corresponding to the amounts of electric charge that have been accumulated as an image signal to the signal processing circuit 9. Due to this, capture of an image of the photographic subject is performed by the imaging element 1, and this image of the photographic subject is converted into an electrical signal and output. It should be understood that the imaging element 1 may, for example, be an imaging element of the CCD (Charge Coupled Device) type or of the CMOS (Complementary Metal Oxide Semiconductor) type or the like.

The imaging element drive circuit 8 generates a drive signal at a predetermined timing according to a command output from the control circuit 5, and supplies this generated drive signal to the imaging element 1. By this drive signal being supplied, accumulation of electric charge and reading out of its accumulated electric charge amounts are controlled by the imaging element 1.

The control circuit 5 obtains information about the brightness of the photographic field on the basis of photometric data for the photographic subject detected by the photometric circuit 15, and determines a charge accumulation interval for the imaging element 1, an aperture for the photographic lens 2, an amplification amount for the image signal output from the imaging element 1, and so on, on the basis of this brightness information. It should be understood that it would also be acceptable to arrange to obtain this information about the brightness of the photographic field from the signal output from the imaging element 1. In this case, the imaging element 1 would function as the photometric circuit 15.

The image signal output from the imaging element 1 is input to the signal processing circuit 9. Upon command from the control circuit 5, the signal processing circuit 9 performs various types of signal processing upon this input image signal, such as amplification, DC reproduction, A/D conversion, white balance adjustment, gamma conversion, and the like. And it outputs the data obtained after this signal processing to the data processing circuit 10 as photographic image data.

Upon command from the control circuit 5, the data processing circuit 10 outputs the photographic image data output from the signal processing circuit 9 to the compression/expansion circuit 11, and also performs resolution conversion processing needed for displaying a replay image upon the monitor 13, in other words performs pixel number conversion. And it outputs the photographic image data after this resolution conversion processing to the display control circuit 14. It should be understood that the data processing circuit 10 may also perform electronic zoom processing. During this electronic zoom processing, resolution conversion processing is performed upon the photographic image data that has been input according to a zoom magnification, and the photographic image data after this processing is output both to the compression/expansion circuit 11 and to the display control circuit 14.

Upon command from the control circuit 5, the display control circuit 14 performs predetermined signal processing upon the photographic image data output from the data processing circuit 10, and outputs the result to the monitor 13. The display control circuit 14 also performs processing to superimpose data for a predetermined overlay image, such as for example a photographic menu or a cursor or the like, over the photographic image data to be output to the monitor 13. By doing this, the photographic subject image is displayed upon the monitor 13 with the overlay image superimposed over it.

Upon command from the control circuit 5, the compression/expansion circuit 11 performs compression processing upon the photographic image data output from the data processing circuit 10 according to a predetermined image compression method, and outputs the photographic image data after compression to the recording medium 12. It should be understood that, by the photographer operating the operation members 7, he is also able to command the imaging device to record the image data without compression. In this case, the compression/expansion circuit 11 does not perform compression processing, but records the photographic image data output from the data processing circuit 10 just as it is upon the recording medium 12.

The operation members 7 include a release button. When the photographer performs photographic operation with this release button, according to this photographic operation, photographic commands are output from the control circuit 5 to the imaging element drive circuit 8, the signal processing circuit 9, the data processing circuit 10, and the compression/expansion circuit 11. When these photographic commands are output from the control circuit 5, processing and control as described above are executed by each of the imaging element drive circuit 8, the signal processing circuit 9, the data processing circuit 10, and the compression/expansion circuit 11. Due to this, photographic image data for an image of the photographic subject is acquired on the basis of the image signal output by the imaging element 1, and is recorded upon the recording medium 12. By doing this, the photographic subject is photographed by the imaging device and a photographic image is acquired, and this photographic image is recorded upon the recording medium 12. It should be understood that, when the photographic subject is photographed, as described above, the photographic image data after resolution conversion processing is output from the display control circuit 14 to the monitor 13, so that a replay image of the photographic image is displayed upon the monitor 13.

It is also possible to display upon the display monitor 13 a replay image according to a photographic image that has already been photographed, on the basis of photographic image data that is already recorded upon the recording medium 12. The mode in which a replay image is displayed in this manner according to a photographic image that has already been photographed is termed the "replay mode".

When the replay mode is selected for the imaging device, according to a command from the control circuit 5, the compression/expansion circuit 11 reads out photographic image data recorded upon the recording medium 12, and, after having performed decoding processing upon this photographic image data that has been read out for eliminating its compression, outputs the photographic image data after decoding to the data processing circuit 10. And the data processing circuit 10 performs resolution conversion processing upon this photographic image data that has been output from the compression/expansion circuit 11 after being decoded, and outputs the result to the display control circuit 14. Then, by outputting this photographic image data after resolution conversion processing from the display control circuit 14 to the monitor 13, a replay image according to the photographic image that has already been photographed is displayed upon the monitor 13.

It should be understood that, if non-compressed photographic image data is recorded upon the recording medium 12, and if this non-compressed photographic image data has been read out from the recording medium 12, then decoding processing is not performed by the compression/expansion circuit 11. It would also be acceptable to arranged for the compression/expansion circuit 11 to perform its compression processing and its decoding processing by reversible compression, in other words according to lossless encoding.

In addition to the above described release button, the operation members 7 include a zoom operation member. When a zoom operation signal is output from the operation member 7 by this zoom operation member being operated by the photographer, then, according thereto, the control circuit 5 generates a lens drive command as previously described, and outputs this command to the lens drive circuit 3. And, on the basis of this lens drive command output from the control circuit 5, the lens drive circuit 3 drives the zoom lens of the photographic lens 2 forwards and/or backwards, as previously described. Due to this the focal length of the photographic lens 2 changes, and zoom adjustment is performed optically by the image of the photographic subject that is being imaged upon the photographic image surface of the imaging element 1 increasing or decreasing in size.

Furthermore, when the zoom operation signal is output from the operation members 7, the control circuit 5 outputs to the data processing circuit 10 a command for performing the electronic zoom processing described previously, along with a zoom magnification. And the data processing circuit 10 performs resolution conversion processing as previously described according to this zoom magnification output from the control circuit 5, and outputs the photographic image data after processing to the display control circuit 14. The resolution conversion ratio at this time is determined in correspondence to the electronic zoom magnification. Due to this, the image of the photographic subject that is being displayed upon the monitor 13 increases or decreases in size, and thereby electronic zooming is performed.

If, in the electronic zooming described above, the zoom magnification is changed to the higher magnification side, then the center portion of the image of the photographic subject will be gradually magnified as it is being displayed upon the monitor 13. At this time, the area upon the image of the photographic subject that is displayed becomes more and more narrowed down as the zoom magnification increases. Conversely, if the zoom magnification is changed to the lower magnification side, then the image of the photographic subject will be gradually shrunk down as it is being displayed upon the monitor 13. At this time, the area upon the image of the photographic subject that is displayed becomes more and more widened out as the zoom magnification diminishes. And, when photographic operation is performed with the release button, photographic image data is recorded upon the recording medium 12 that corresponds to the area upon the image of the photographic subject that is being displayed upon the monitor 13 at this time.

The shake detection sensor 16 is provided within the body of the imaging device, and may consist of, for example, an angular velocity sensor, a gyro sensor, or the like. This shake detection sensor 16 detects movement of the imaging device, in other words shaking of the body of the imaging device, in at least two directions that are orthogonal to the optical axis, and outputs a detection signal to the control circuit 5 that corresponds to the amount of shaking that has been detected. And, on the basis of this detection signal, the control circuit 5 performs shake correction as previously described, so as to cancel out the shifting of the image of the photographic subject upon the photographic image surface of the imaging element 1 that occurs together with the shaking of the imaging device body. It should be understood that this shake correction may be performed not only during photography, but also during the acquisition of a through image that will be described hereinafter.

2. Overall Operation

Figure 2:
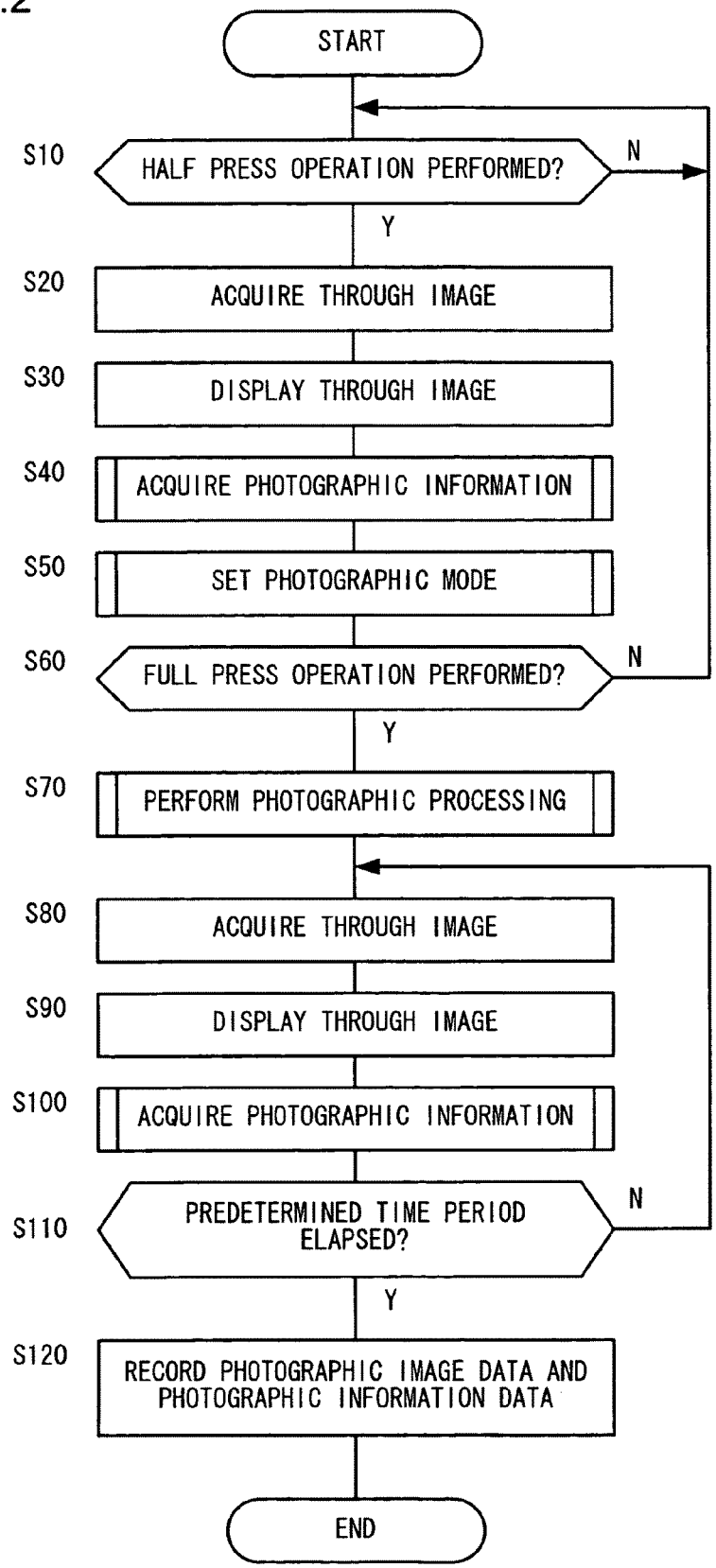
FIG. 2 is a flow chart of processing executed when a photographic mode has been set.

Next, the overall operation when this imaging device explained above performs photography will be explained. When the photographic mode for performing photography is set by operation of the operation members 7, the processing of the flow chart shown in FIG. 2 is executed by the control circuit 5. In a step S10, the control circuit 5 makes a decision as to whether or not the release button of the operation members 7 has been half press operated by the photographer. When half press operation is performed and a half press operation signal is input to the control circuit 5 from the operation members 7 on the basis of this half press operation, then the control circuit 5 proceeds to the next step S20.

In this step S20, the control circuit 5 acquires a through image of the photographic subject. And in the next step S30, the control circuit 5 displays the through image acquired in the step S20 upon the display monitor 13.

In the step S20 described above, the control circuit 5 sends a command to the imaging element drive circuit 8, and outputs a drive signal to that imaging element drive circuit 8 for performing through-image photographic operation. Upon receipt of this drive signal, the imaging element 1 outputs an image signal corresponding to the amounts of electric charge accumulated for each pixel repeatedly at a predetermined frame rate, for example 30 frames per second. And the signal processing circuit 9, along with performing signal processing as previously described upon this image signal output from the imaging element 1, also adds together the signals of pixels of the same color that are positioned in mutual proximity upon the imaging element 1. Due to this, photographic image data having a lower resolution as compared to the case during the main photography that will be described hereinafter, in other words whose number of pixels is smaller, is output to the data processing circuit 10 as through image photographic image data. And, by doing this, preparatory photography is performed before the main photography, and, due to this preparatory photography, a through image of the photographic subject is acquired as a preparatory image. It should be understood that, at this time, the exposure conditions are determined on the basis of photometric data from the photometric circuit 15. At this time, instead of adding together the signals from pixels of the same color, it would also be acceptable to arrange simply to thin out the image signal while reading it out from the imaging element 1.

After having performed resolution conversion processing upon the through image photographic image data output from the signal processing circuit 9, the data processing circuit 10 temporarily stores the data after processing, and outputs it to the display control circuit 14. It should be understood that a memory for temporarily storing the through image photographic image data after resolution change processing is provided in the data processing circuit 10. In the step S30 described above, the control circuit 5 makes the display control circuit 14 display a through image upon the monitor 13 on the basis of the data output from the data processing circuit 10. Due to this, a through image of the photographic subject is displayed upon the monitor 13. By a through image being displayed in this manner, the photographer is able to observe, on the screen of the monitor 13, the state of the photographic field that he is shortly going to proceed to photograph. It should be understood that the acquisition of the through image in the step S20 explained above and the display of the through image in the step S30 are performed in parallel.

It should be understood that, when acquiring the through images as described above, the photographic subject is photographed at a lower pixel resolution than during the main photography. In other words, by reading out the amounts of electric change from the various pixels of the imaging element 1 while thinning them out, or by reading out the amounts of electric charge for a plurality of pixels while adding them together, the through images are acquired at lower pixel resolution than during the main photography. By doing this, it becomes possible to perform photography at a high frame rate. Moreover, the data for the through images that are acquired is not recorded upon the recording medium 12.

When acquiring these through images as explained above, according to requirements, it would also be acceptable to arrange to perform focus adjustment of the photographic lens by performing auto focus operation, as previously described. It should be understood that it is possible to perform the required detection of the focal adjustment state during this focus adjustment by the well known split pupil phase difference (or contrast) detection method, using, for example, pixels for focus detection provided upon the imaging element 1, and a focus detection optical system such as a micro lens or the like that is provided to each of these pixels. It would also be acceptable to provide an element including pixels for focus detection separately from the imaging device 1, and to arrange to perform the focus adjustment by using this element. Or, it would also be acceptable to utilize some other method, such as the contrast method or the like.

Then, in a step S40, the control circuit 5 acquires photographic information. This photographic information is information related to the circumstance of photography when the through image was acquired in the step S30, and shows the state of the photographic subject in the through image, or change of the setting of the imaging device when the through image was acquired. In other words, by acquiring this photographic information, the control circuit 5 is able to ascertain the state of the photographic subject when the through image was acquired, or change of state of the imaging device, and is thus able to be aware of the photographic state at this time. The concrete details of the method by which the photographic information is acquired here will be explained subsequently with reference to the flow chart of FIG. 3.

In a step S50, the control circuit 5 sets a photographic mode on the basis of the photographic information acquired in the step S40. The concrete details of the method by which a photographic mode is set here will be explained subsequently with reference to the flow chart of FIG. 4.

In a step S60, the control circuit 5 makes a decision as to whether or not the release button of the operation members 7 has been full press operated by the photographer. When full press operation is performed and a full press operation signal is input from the operation members 7 to the control circuit 5 on the basis of this full press operation, then the control circuit 5 advances the flow of control to a step S70. On the other hand, if a full press operation signal has not been input, then the control circuit 5 returns the flow of control to the step S10.

Due to the processing of the steps S10 through S60 as explained above, while half press operation is being performed, through images of the photographic subject are repeatedly acquired at the predetermined frame rate, and, along with these images being displayed upon the monitor 13, photographic information related to the circumstance of photography at this time is acquired. It should be understood that the acquired photographic information is initially stored in correspondence to the number of image frames according to the memory capacity that is determined in advance in the control circuit 5. If this memory capacity is exceeded, then the photographic information is discarded in order from the oldest, and the memory is updated with new contents.

In a step S70, the control circuit 5 performs photographic processing for photographing the photographic subject. This photographic processing is executed according to full press operation of the release button of the operation members 7 by the photographer. By doing this, the photographic subject is photographed and a photographic image is acquired. The photography of the photographic subject that is performed in this manner is here termed the "main photography". It should be understood that the concrete details of this photographic processing will be explained subsequently with reference to the flow chart of FIG. 5.

In steps S80 through S100, the control circuit 5 performs similar processing to that of the steps S20 through S40, previously described. In other words: in the step S80, the control circuit 5 acquires a through image of the photographic subject; in the step S90, it displays the through image that has been acquired; and, in the step S100, it acquires photographic information related to the circumstance of photography at this time.

Then, in a step S110, the control circuit 5 makes a decision as to whether or not a predetermined time period has elapsed from when the photographic processing was executed in the step S70. If the predetermined time period, for example two seconds, has elapsed, then the flow of control proceeds to the next step S120, while, if the predetermined time period has not elapsed, the flow of control returns to the step S80. Due to this, even after the main photography has been performed by the photographic processing of the step S70, the preparatory photography continues to be performed until the predetermined time period elapses, and, along with through images being acquired by this preparatory photography as preparatory images, photographic information related to the circumstance of photography at this time is acquired.

In the step S120, the control circuit 5 records upon the recording medium 12 the photographic image data that was acquired during the photographic processing of the step S70, and photographic information data based upon the photographic information that was acquired during the steps S40 and S100. This photographic information data is not just the through image data itself, but rather is details of the acquired photographic information converted into data, and is stored in correlation with the photographic image data. In other words, the photographic image that was acquired by the main photography (i.e. the main photographic image) and the photographic information that was acquired during the preparatory photography are stored in mutual correspondence. It should be understood that, at this time, the through image data that was initially stored in the memory of the data processing circuit 10 is deleted. Due to this it becomes possible, when reading out the main photographic image data from the recording medium 12, to read out the photographic information data that was acquired when this main photographic image was acquired. Or, it would also be acceptable to provide a structure in which, in addition to the photographic information data, data for a local region in the through image is recorded upon the recording medium 12.

After having executed the step S120, the control circuit 5 terminates the flow chart of FIG. 2. Photography is performed with this imaging device by executing the procedure explained above.

It should be understood that it would also be acceptable to execute only one or the other of the processing of the steps S20 through S40, and the processing of the steps S80 through S100. In other words, along with acquiring and displaying the through images, it is possible to perform the processing for acquiring the photographic information related to the circumstance of photography at that time either only before, or only after, the main photography; and it is also possible to perform that task both before and after the main photography. Or, it would also be acceptable to arrange to perform the processing of the steps S80 through S100, only while the release button is being full press operated after the main photography. Furthermore, it would also be acceptable to arrange to determine the timing at which the processing described above is performed, according to the photographic mode that is set.

3. Acquisition of the Photographic Information

Next, the processing that is executed when performing the acquisition of the photographic information in the steps S40 and S100 of FIG. 2 will be explained with reference to the flow chart of FIG. 3. In a step S210, the control circuit 5 reads out one or more through image frames acquired before the current one by reading out the photographic image data for those through images that, as previously described, is stored by the data processing circuit 10. It should be understood that, here, it would be acceptable to arrange to read out only one through image frame; or alternatively it would also be acceptable to arrange to read out a plurality of through image frames.

In a step S220, on the basis of the previous through image frame that was read out in the step S210 and the newest through image frame that was acquired in the step S20 or the step S80 executed directly previously, the control circuit 5 performs pattern matching by comparing these two through images with one another. Change of the through image from the previous frame to the newest frame is detected by this pattern matching. It should be understood that it would also be acceptable for pattern matching to be performed between a through image and the main photographic image.

In a step S230, on the basis of the result of the pattern matching executed in the step S220, the control circuit 5 makes a decision as to whether or not there is any movement of the photographic subject. If there is movement of the photographic subject, in other words if there is any change in the position of the photographic subject in these through images, then the control circuit 5 transfers the flow of control to a step S240. On the other hand, if there is no change in the through image, so that movement of the photographic subject has not been seen, then the control circuit 5 transfers the flow of control to a step S260.

In a step S240, on the basis of the pattern matching in the step S220, the control circuit 5 calculates a movement vector (that is the speed and the direction of the movement of the photographic subject in the through images), and also calculates the size of this photographic subject. The size of the photographic subject may be, for example, given by the size of the moving photographic subject (i.e. the number of pixels of the area of this photographic subject) with respect to the size of the entire screen, or the like. In the next step S250, the control circuit 5 acquires the movement vector calculated in the step S240 as photographic information that specifies the state of the photographic subject in the through image.

The method of calculating the movement vector in the step S240 will now be explained with reference to the example of a through image shown in FIG. 6. From the time point t1 to the time point t5, through images as shown in (a) through (e) are acquired in order as preparatory photography for a photographic subject 21. When pattern matching is performed by comparing these through images with one another, it can be determined that this photographic subject 21 is shifting at a certain shifting speed from the direction of the upper right towards the direction of the lower left. In the step S240, along with calculating the size of this photographic subject 21, the speed and the direction of the movement of this type of photographic subject 21 are calculated as its movement vector.

Then, in a step S260, on the basis of the pattern matching in the step S220, the control circuit 5 makes a decision as to whether or not, in the through image, there is any blinking portion in the photographic subject. If there is a blinking portion, then in a step S270 the control circuit 5 acquires blink information that specifies this blinking state as photographic information that specifies the state of the photographic subject in the through image. On the other hand, if no blinking portion is present, then the control circuit 5 does not execute the step S270, but proceeds to a step S280.

The method of acquiring the blink information in the step S270 will now be explained with reference to the example of a through image shown in FIG. 7. From the time point t1 to the time point t5, through images as shown in (a) through (e) in which blinking is repeated on a fixed cycle are acquired in order as preparatory photography for a photographic subject 22. When pattern matching is performed by comparing these through images with one another, it is possible to determine the position, the luminance, the blinking period and so on of this photographic subject 22. In the step S270, this information is acquired as blink information for the photographic subject 22.

It should be understood that, if there are a plurality of blinking portions in the photographic subject, then blink information is acquired for each of these blinking portions. At this time, it is desirable also to acquire phase information for the blinking portions, in order to specify the variation of their blink timings. Moreover, if the luminance is changing continuously, or if the color of the emitted light changes, in the same way, it is possible to acquire the state of such changes as blink information. It should be understood that, at this time, it would also be acceptable to arrange to decide upon blinking on the basis of the output of the shake detection sensor 16. In other words, if the gaps between the blinking elements are larger than the shift amount output from the shake detection sensor 16, then it may be decided that there are a plurality of blinking elements.

In the step S280, the control circuit 5 makes a decision as to whether or not zoom changing is present. If zoom changing is present, in other words if, due to operation of the zoom operation member by the photographer, the zoom lens of the photographic lens 2 has been driven as previously described so that the focal length has changed, then in a step S290 the control circuit 5 acquires focal length change information that specifies the state of this change of the focal length. By doing this, focal length change information is acquired as photographic information that specifies the setting change of the imaging device during through image acquisition. On the other hand, if no zoom changing is present, then the control circuit 5 does not execute the step S290, and proceeds to a step S300.

In this step S300, the control circuit 5 makes a decision as to whether or not a change of aperture is present. If the aperture of the photographic lens 2 has changed due to operation by the photographer or the like, then in a step S310 the control circuit 5 acquires aperture change information that specifies the state of this change of the aperture. By doing this, aperture change information is acquired as photographic information that specifies the setting change of the imaging device during through image acquisition. On the other hand, if no aperture change is present, then the control circuit 5 does not execute the step S310, and proceeds to a step S320.

In this step S320, the control circuit 5 makes a decision as to whether or not a change of focus is present. If a focus change is present, in other words if the focal adjustment state of the photographic lens 2 has changed due to focus adjustment having been performed by auto focus processing as described previously, or due to manual operation by the photographer, then in a step S330 the control circuit 5 acquires focus change information that specifies the state of this change of focus. By doing this, focus change information is acquired as photographic information that specifies the setting change of the imaging device during through image acquisition. On the other hand, if no focus change is present, then the control circuit 5 does not execute the step S330, and proceeds to a step S340.

In this step S340, the control circuit 5 makes a decision as to whether or not movement of the camera is present. If camera movement is present, in other words if the shake detection sensor 16 detects the occurrence of shaking of the body of the imaging device due to the photographer performing panning or tilting of the imaging device of FIG. 1, then in a step S350 the control circuit 5 acquires camera movement information that specifies the state of the direction of this movement and its size and so on. By doing this, camera movement information is acquired as photographic information that specifies the setting change of the imaging device during through image acquisition. On the other hand, if no camera movement is present, then the control circuit 5 does not execute the step S350, and proceeds to a step S360.

In this step S360, on the basis of the pattern matching of the step S220, the control circuit 5 makes a decision as to whether or not oscillatory movement of the photographic subject is present in the through image. Here, movement in which the photographic subject flutters due to the flow of air or water, or repetitive movement of the photographic subject that is repeated regularly upon a fixed cycle or the like, is determined to be oscillatory movement of the photographic subject. For example, hand movement when a person waves his hand, flapping movement of a koi-nobori (i.e. a traditional carp-shaped tubular streamer), a flag, hair, or the like in the wind, fluttering-down movement of petals or leaves, flickering movement of a fire, or soaring movement of dust in a flame, may be determined to be oscillatory movement of the photographic subject. It would also be acceptable to arrange, after having recognized in advance that the photographic subject is a hand, a streamer, a flag, a paper, a fire or the like, to specify that region upon the screen, and to decide upon oscillatory movement for that region of the photographic subject that has been recognized. If this type of oscillatory movement is present, then the control circuit 5 proceeds to a step S365. On the other hand, if no oscillatory movement of the photographic subject is present, then the control circuit 5 transfers control to a step S375.

In the step S365, on the basis of the result of the pattern matching in the step S220, the control circuit 5 acquires oscillatory movement information that specifies the oscillatory movement of the photographic subject. Here, for example, the type of the oscillatory movement of the photographic subject as previously described, and/or the amplitude and the period of the oscillatory movement, may be acquired as the oscillatory movement information. The control circuit 5 acquires this type of oscillatory movement information as photographic information that specifies the state of the photographic subject in the through image.

In a step S370, the control circuit 5 cuts out from the through image the background image of the photographic subject for which it has been decided in the step S360 that oscillatory movement is present, and acquires this cut out background image as photographic information. Here, the portions around the photographic subject that is shaking are cut out from each of a plurality of through images, and the background image is acquired by combining together these images that have been cut out. By doing this, it is possible to acquire the background image of a photographic subject that is shaking, in other words, it is possible to acquire an image of the portions that come into view and go out of view due to the oscillatory movement of the photographic subject.

It should be understood that a preferred embodiment may have a structure as described below. The control circuit 5 stores the through image data in its memory. And the control circuit 5 further, records through image data of the local regions that, while they were regions of the photographic subject at least in the main photographic image, are the backgrounds in the through images for which the amount of oscillatory movement of the photographic subject is the largest, as compared to the photographic subject within the main photographic image for which it has been decided that oscillatory movement is present, in correlation with the main photographic image. By providing this sort of structure, it is possible to replay the way in which the photographic subject is shaking with a small quantity of additional data.

In the step S375, the control circuit 5 makes a decision as to whether or not the photographic scene is a group photograph. If it is a group photograph, then the flow of control proceeds to a step S380, while if it is some other type of photographic scene, then the flow of control is transferred to a step S385. It should be understood that this decision may be performed by identifying, from the through images, portions that have the characteristics of the faces of people. In other words, if it has been possible to identify a plurality of portions in the through images that possess the characteristics of the faces of people, then it is decided that this photographic scene is a group photograph, while if this is not the case, then it is decided that this photographic scene is not a group photograph. It would also be acceptable to arrange to decide whether or not this is a group photograph, according to some other type of method. For example, it would be acceptable to arrange for the photographer to be able to set a photographic mode for group photography for the imaging device.

In the step S380, the control circuit 5 cuts out from the through images those images that match portions that are the eyes of people (i.e. the eye images), and acquires the cut out eye images as photographic information. At this time, eye images for each of the plurality of persons who are photographed in the through images are cut out and acquired. It should be understood that it would also be acceptable to arrange to decide whether or not the eyes of each person are open, and to acquire eye images when their eyes are open.

In the step S385, on the basis of the luminance or the like of the through images, the control circuit 5 makes a decision as to whether or not the scene that is being photographed is a night scene. If a night scene is being photographed, then the flow of control proceeds to a step S390. In this step S390, the control circuit 5 cuts out the background image from the through image, and acquires this cut out background image as photographic information. Here, if during the main photography flash light is emitted towards the photographic subject, then the background image that is (undesirably) not photographed in this photographic image since its luminance is low as compared to that of the photographic subject that is illuminated, is cut out and acquired from the through images taken while flash light is not being emitted.

Figure 3:
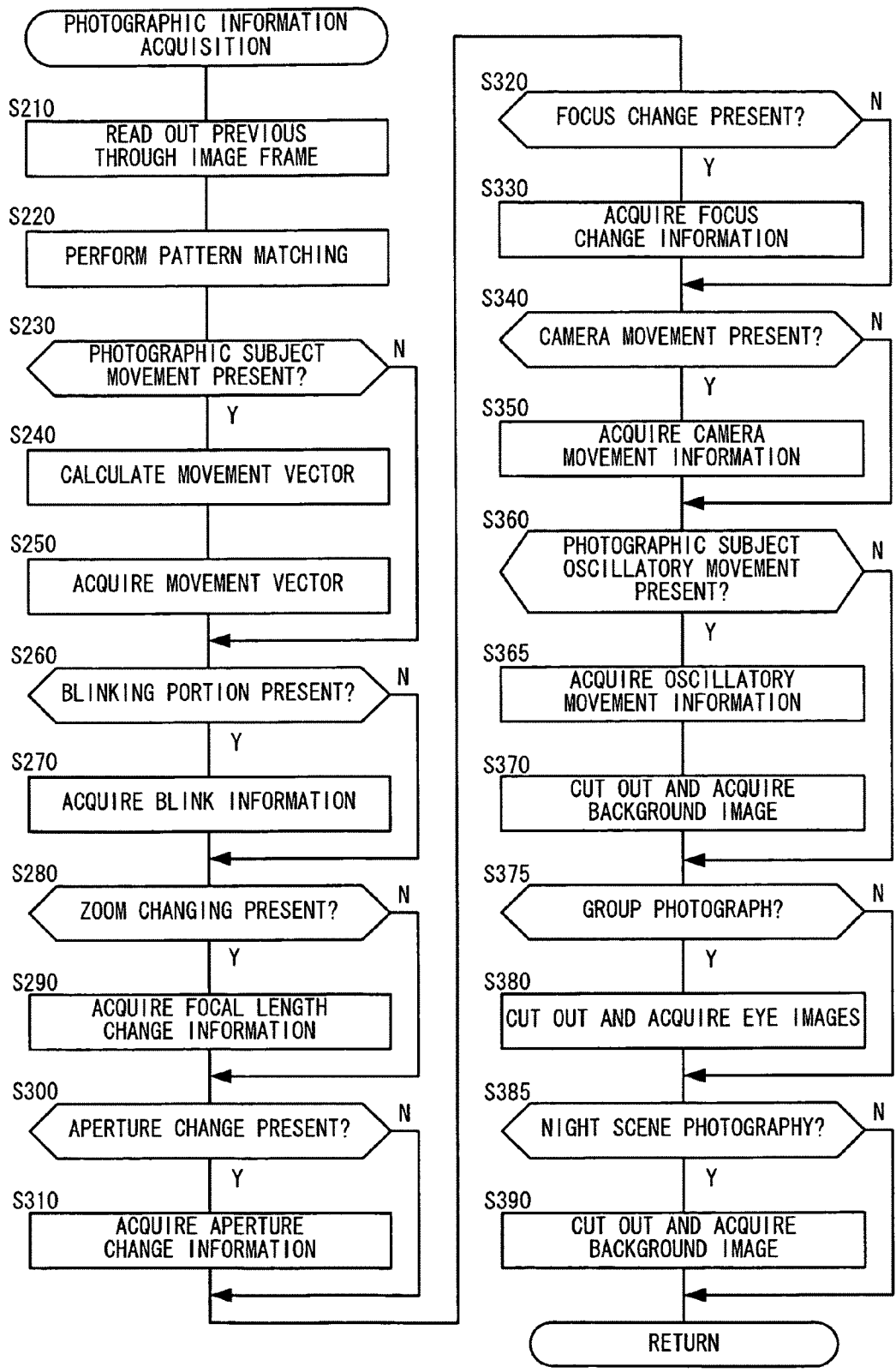
FIG. 3 is a flow chart of processing executed when acquiring change information for an image of a photographic subject.

When the step S390 has been executed, the control circuit 5 terminates the flow chart of FIG. 3. On the other hand, if this is not photography of a night scene, then the control circuit 5 does not execute the step S390, but terminates the flow chart of FIG. 3. By performing the procedure explained above, photographic information is acquired that specifies the state of the photographic subject in the through images, or that specifies the change of setting of the imaging device during through image acquisition. Moreover, information that specifies the images obtained by cutting out portions of the through images, or that specifies the oscillatory movement of the photographic subject in the through images or the like, is also acquired as photographic information.

4. Setting the Photographic Mode

Figure 4:
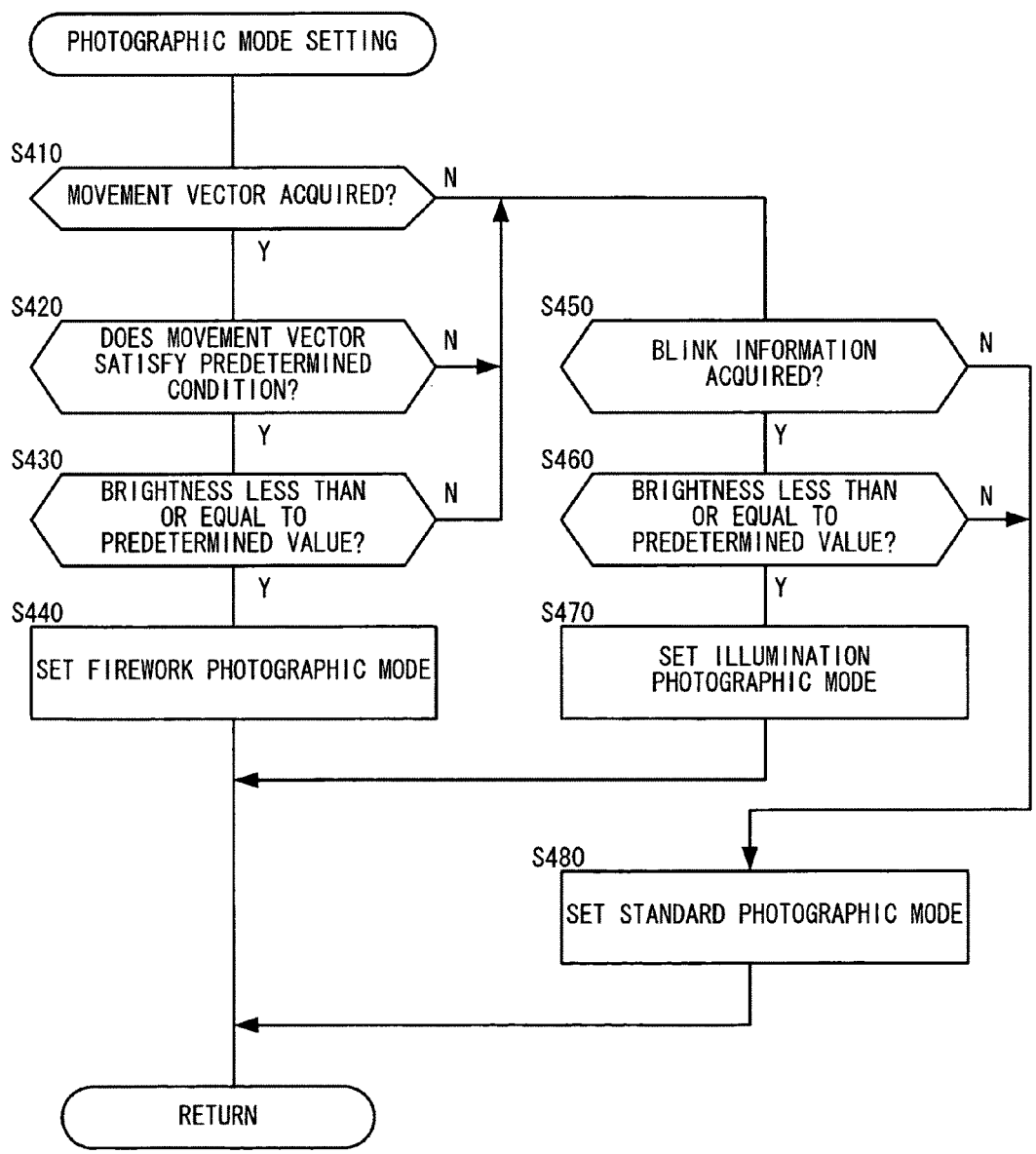
FIG. 4 is a flow chart of processing executed when performing setting of the photographic mode.

Next, the processing that is executed when performing the setting of a photographic mode in the step S50 of FIG. 2 will be explained with reference to the flow chart of FIG. 4. In a step S410, the control circuit 5 makes a decision as to whether or not a movement vector has been acquired as photographic information. If a movement vector has been acquired due to the step S250 of FIG. 3 being executed, then the flow of control proceeds to a step S420. On the other hand, if the step S250 of FIG. 3 has not been executed and no movement vector has been acquired, then the flow of control is transferred to a step S450.

In the step S420, the control circuit 5 makes a decision as to whether or not the movement vector that has been acquired satisfies a certain predetermined condition. If it does satisfy the predetermined condition, for example in a case such as when the movement vector expresses the fact that a bright spot of size less than or equal to a predetermined size is shifting from the bottom of the photographic scene in the upward direction, then the control circuit 5 advances the flow of control to a step S430. On the other hand, if this type of condition is not satisfied, then the control circuit 5 transfers the flow of control to the step S450.

In the step S430, the control circuit 5 makes a decision as to whether or not the brightness of the through image that has been acquired (i.e. the average brightness over the entire screen) is less than or equal to a predetermined value. It should be understood that it would also be acceptable to arrange for the brightness of the through image to be acquired by the photometric circuit 15. If the brightness of the through image is less than or equal to the predetermined value, then the control circuit 5 performs setting of a firework photographic mode in a step S440. This firework photographic mode is a mode in which photographic conditions well adapted to photography of fireworks are set for the imaging device: for example, the shutter speed may be set to "bulb", and focus adjustment may be automatically performed to a photographic subject that is shifting within the photographic field. Moreover, it will also be acceptable to arrange to perform accentuation processing of the color saturation level with the data processing circuit 10, in order to make it possible to photograph the fireworks vividly. When the firework photographic mode has been set in this manner, the control circuit 5 terminates the flow chart of FIG. 4. It should be understood that it would also be acceptable to provide a structure in which, not such a firework photographic mode, but rather a mode for photographing a moving body whose luminance is low, is set. On the other hand, if in the step S430 it is decided that the brightness of the through image is not less than or equal to the predetermined value, then the control circuit 5 transfers the flow of control to the step S450.

If the flow of control is transferred from any one of the steps S410, S420, or S430 to the step S450, then in this step S450 the control circuit 5 makes a decision as to whether or not blink information has been acquired as photographic information. If blink information has been acquired due to the step S270 of FIG. 8 having been executed, then the flow of control proceeds to a step S460. On the other hand, if the step 270 of FIG. 3 has not been executed and blink information has not been acquired, then the flow of control is transferred to a step S480.

In the step S460, the control circuit 5 makes a decision as to whether or not the brightness of the through image that has been acquired (i.e. the average brightness over the entire screen) is less than or equal to a predetermined value. It should be understood that it would also be acceptable to arrange for the brightness of the through image to be acquired by the photometric circuit 15. If the brightness of the through image is less than or equal to the predetermined value, then in a step S470 the control circuit 5 performs setting of an illumination photographic mode. This illumination photographic mode is a mode in which photographic conditions well adapted for photographing a night scene that includes an illumination (a lighting display) or the like are set for the imaging device, and in this mode, for example, the aperture of the photographic lens 2 may be set to wide open, and a main photographic subject other than any blinking portions, for example a person or the like, may be searched for, and focus adjustment may be performed automatically upon that main photographic subject. It should be understood that, at this time, such blinking portions are determined on the basis of the blink information that has been acquired as change information for the photographic subject. When the illumination photographic mode has been set in this manner, the control circuit 5 terminates the flow chart of FIG. 4. On the other hand, if in the step S460 it is decided that the brightness of the through image is not less than or equal to the predetermined value, then the control circuit 5 transfers the flow of control to the step S480.

If the flow of control is transferred from either the step S450 or the step S460 to the step S480, then in this step S480 the control circuit 5 performs setting of the standard photographic mode. This standard photographic mode is a photographic mode that is neither the above described firework photographic mode nor the illumination photographic mode. If this standard photographic mode is set, then photography is performed according to photographic conditions that have been set in advance by the photographer. After the standard photographic mode has been set, the control circuit 5 terminates the flow chart of FIG. 4. The setting of the photographic mode is performed by executing the procedure explained above.

It should be understood that, according to the photographic information that has been acquired, it would also be acceptable to arrange to set various other kinds of photographic mode other than those whose details have been explained above. For example, on the basis of a movement vector that has been acquired as photographic information, it would be possible to set the shutter speed to slow, to set hand shake correction to be implemented, or to set a photographic mode for photographing a photographic subject that is shifting at high speed. It would also be possible to set various other types of photographic mode than these.

5. The Photographic Processing

Next, the processing that is executed when performing the photographic processing of the step S70 of FIG. 2 will be explained with reference to the flow chart of FIG. 5. In a step S610, the control circuit 5 makes a decision as to whether or not a movement vector has been acquired as photographic information. If a movement vector has been acquired by the step S250 of FIG. 3 being executed, then the flow of control proceeds to a step S620. On the other hand, if the step S250 of FIG. 3 was not executed and no movement vector has been acquired, then the flow of control is transferred to a step S650.

In the step S620, on the basis of the movement vector that was acquired as photographic information, the control circuit 5 performs detection of an object intruding into the photographic field. Here, if a movement vector has been acquired for some body other than the main photographic subject, then this body is detected as being an intruding object. It should be understood that the main photographic subject may be determined on the basis of, for example, position within the photographic scene, the set position of the focus detection area during auto focusing, or the like.

In the step S630, for the intruding object that was detected in the step S620, the control circuit 5 makes a decision as to whether or not the intrusion direction into the photographic field or the size of this intruding object satisfies a certain condition that is determined in advance. This predetermined condition is set according to a criterion such as whether the intruding object blocks the view of the main photographic subject. For example, if the intruding object has entered into the photographic field from a horizontal direction, or if the size of the intruding object is greater than or equal to a predetermined size as compared to the photographic screen, then it may be decided in this step S630 that the predetermined condition is satisfied. If it is decided that the condition of this type is satisfied, then the control circuit 5 progresses to a step S640. On the other hand, if it is decided that the condition of this type is not satisfied, then the control circuit 5 transfers the flow of control to the step S650.

In the step S640, on the basis of the movement vector that was acquired, the control circuit 5 makes a decision as to whether or not the intruding object detected by the step S620 has passed through the photographic field. And the control circuit 5 waits at this step S640 until the intruding object has passed through the photographic field, and proceeds to the next step S650 when the intruding object has passed through. By doing this, if an intruding object is detected, the main photography is prevented, and photography of the photographic subject is prevented, until this intruding object has passed by.

As explained above, when in the step S620 an object intruding into the photographic field is detected, then the main photography of the step S680 that will be explained hereinafter is permitted or prohibited by the processing of the steps S630 and S640, according to the result of this detection. In other words, if the intrusion direction or the size of the intruding object that has been detected satisfies the predetermined condition, then it is considered that the main photographic subject is being obscured by this intruding object, and photography is prohibited until the intruding object passes over the photographic field. In any other case, photography is permitted even though the intruding object is detected.

It should be understood that, in the step S630, it is desirable to eliminate any direction of intrusion that corresponds to movement of the imaging device during panning or tilting, from the directions of intrusion for which photography is prevented. In other words, if it has been detected by the shake detection sensor 16 that movement of the imaging device in the horizontal direction (i.e. panning) is taking place, then, even though a photographic subject may be stationary, this photographic subject moves so as to intrude into the photographic field from the horizontal direction. Accordingly, in this type of case, even if an intruding object has arrived and is intruding into the photographic field from the horizontal direction, nevertheless it is arranged to eliminate this object from the subjects of decision in the step S630, and to permit photography.

It should be understood that it is not necessary to execute the processing of the steps S610 through S640 explained above; it may be omitted. For example, it would also be acceptable to arrange only to execute this processing if, according to operation by the photographer, it is desired to prohibit the main photography until the intruding object has passed through the photographic field. Moreover, it would also be acceptable to arrange, when the photographic subject is not moving in the through image, to acquire this fact as photographic information, and to permit the main photography in this case.

In the step S650, the control circuit 5 makes a decision as to whether or not the illumination photographic mode is set for the imaging device. If the illumination photographic mode is set by executing the step S470 of FIG. 4, then the flow of control proceeds to a step S660, while if the illumination photographic mode is not set, then the flow of control is transferred to a step S670.

In the step S660, the control circuit 5 determines the photographic timing on the basis of the blink information that was acquired as photographic information. Here, for example, on the basis of the blink periods, phases, luminances or the like of the blinking portions specified by the blink information, a predicted instant at which the greatest number of the illumination portions will be on may be determined as being the photographic timing In the step S670, the control circuit 5 makes a decision as to whether or not the photographic timing that was determined in the step S660 has arrived. Until the photographic timing arrives, the control circuit waits at this step S670, while, when the photographic timing arrives, the flow of control proceeds to the next step S680. By doing this, if the illumination photographic mode is set, control is exerted so that the main photography is performed at the appropriate timing.

In the step S680, the control circuit 5 executes the main photography. At this time, as previously described, the control circuit 5 outputs photography commands to each of the imaging element drive circuit 8, the signal processing circuit 9, the data processing circuit 10, and the compression/expansion circuit 11. And, according to this photography command, the imaging element drive circuit 8 outputs a drive signal to the imaging element 1 for performing the main photography. Upon receipt of this drive signal from the imaging element drive circuit 8, the imaging element 1 performs accumulation of electric charges according to the exposure conditions for the main photography as determined on the basis of the photometric data from the photometric circuit 15, and outputs an image signal according to these accumulated electric charges. It should be understood that it would also be acceptable to arrange to determine these exposure conditions for the main photography, on the basis of the brightness information for the photographic field that was obtained from the most recent through image.

The signal processing circuit 9 performs the signal processing described previously upon the image signal output from the imaging element 1, and outputs higher resolution photographic image data than that which was used for the through images previously described to the data processing circuit 10 as photographic image data for the main photography. And the data processing circuit 10, along with outputting this photographic image data for the main photography that was output from the signal processing circuit 9 to the compression/expansion circuit 11, also performs resolution conversion processing thereupon, and outputs the resulting data to the display control circuit 14. Due to this, along with the photographic image data that was obtained by the main photography being output from the compression/expansion circuit 11 to the recording medium 12 and being recorded upon the recording medium 12, also the main photographic image is displayed upon the monitor 13. By performing the main photography in this manner, the photographic subject is photographed, and a photographic image is acquired.

In the step S690, the control circuit 5 makes a decision as to whether or not an intruding object was detected in the step S620 described above. And, if an intruding object was detected in the step S620, then the control circuit 5 proceeds to a step S700.

In the step S700, the control circuit 5 records the result of intruding object detection in the step S620 upon the recording medium 12. This result of intruding object detection is recorded in correlation with the photographic image data obtained by the main photography. In other words, information about the result of intruding object detection is recorded upon the recording medium 12 in correlation with the main photographic image. Due to this, for photographic image data recorded upon the recording medium 12, it is possible to decide whether or not an intruding object was detected during the photography thereof in a simple and easy manner, in particular if the processing of the steps S610 through S640 has been omitted or the like.

It should be understood that it would also be acceptable to arrange matters so that, in the step S700 described above, even though an intruding object was detected, if it was decided in the step S630 that the predetermined condition was not satisfied or if due to the processing of the step S640 photography was prohibited until the intruding object passed through the photographic field, then this intruding object is eliminated from the subjects recorded as results of detection. In other words if it is decided, according to the direction of intrusion into the photographic field or according to the size of the intruding object, that this intruding object does not obscure the main photographic subject, or if in the step S680 the intruding object had shifted out of the photographic field before the photographic subject was photographed, then it is possible to eliminate this intruding object as a subject recorded as a result of detection. If this is done, then it is possible to eliminate the result of detecting an intruding object that has not exerted any influence upon the photography from the subjects of recording, so that it is possible to avoid unnecessary recording of a result of intruding object detection.

Moreover, in the case of a situation occurring such as when it is not possible to detect an intruding object due to a lack of contrast or brightness in the through image, then it is desirable for the control circuit 5 to record this information upon the recording medium 12, instead of the result of intruding object detection. If this is done, then it is possible to distinguish this from a case when an actually intruding object is photographed.

Figure 5:
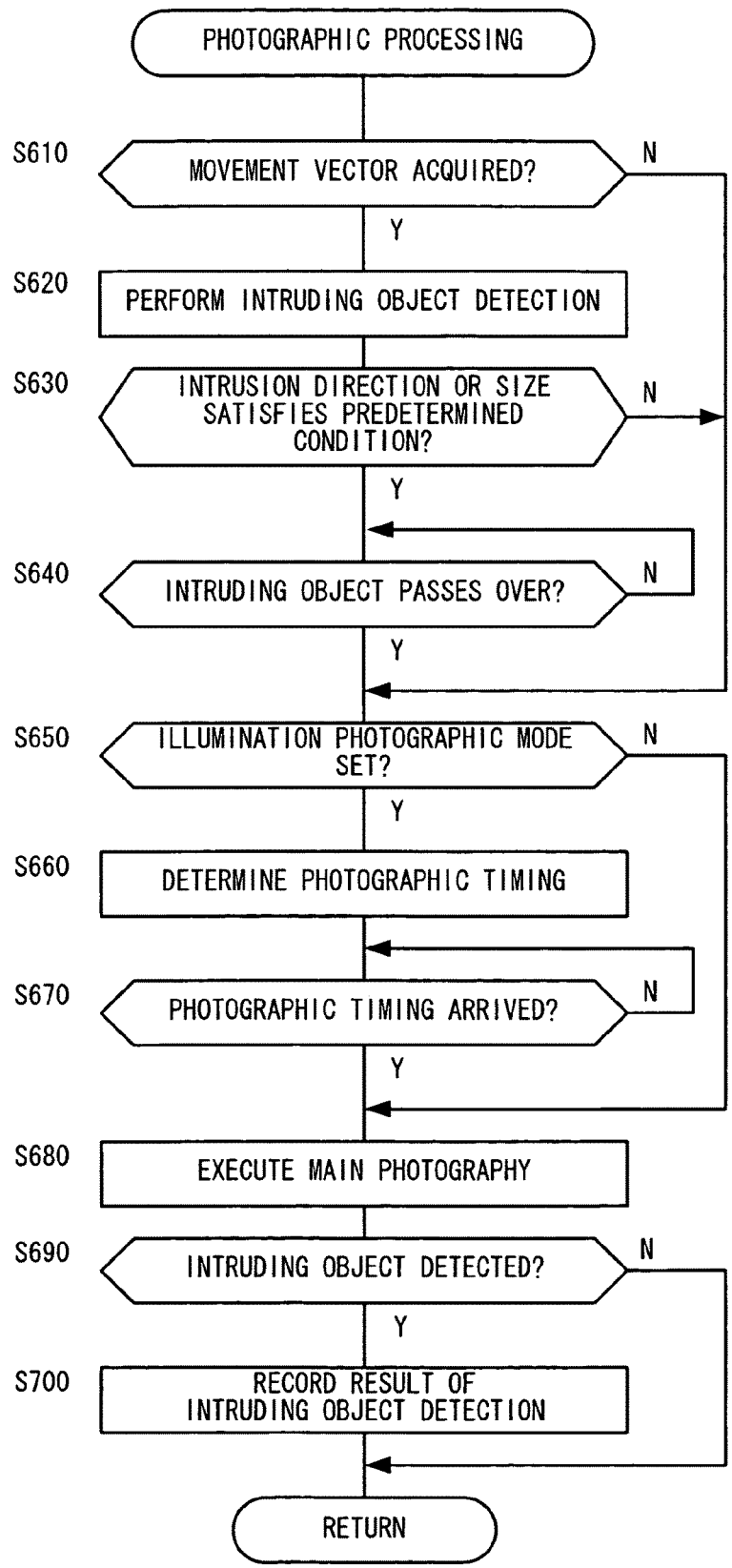
FIG. 5 is a flow chart of processing executed when performing photographic processing.

When the step S700 has been executed, the control circuit 5 terminates the flow chart of FIG. 5. On the other hand, if in the step S690 it is decided that no intruding object has been detected, then the control circuit 5 terminates the flow chart of FIG. 5 without executing the step S700. The photographic processing is performed by executing the processing described above.

6. Replaying a Photographic Image

Now the replaying of a photographic image will be explained. When the replay mode previously described is selected upon this imaging device, photographic image data recorded upon the recording medium 12 is read out by the compression/expansion circuit 11. The compression/expansion circuit 11 performs decoding processing upon this photographic image data that has been read out, and the result is output to the display control circuit 14, after resolution conversion processing has been further performed thereupon by the data processing circuit 10. The display control circuit 14 then outputs this photographic image data to the monitor 13. By doing this, on the basis of the photographic image data recorded upon the recording medium 12, a replay image corresponding to the photographic image is displayed on the monitor 13. At this time, by reading out the photographic information data recorded in correlation with the photographic image data in the step S120, as explained below, it is possible to display various types of replay image showing the circumstance of photography when the through image was acquired, on the basis of the details of the photographic information specified by this photographic information data.

First, sliding replay that is performed on the basis of the details of the movement vector in the photographic information will be explained. When a movement vector is acquired in the step S250 of FIG. 3, then, as previously described, on the basis of this movement vector, photographic information data is recorded upon the recording medium 12 in correlation with the photographic image data obtained by the main photography. With sliding replay, the position of the photographic subject in the replay image is displayed while being slid, so as to match the movement of the photographic subject specified by this movement vector.

Figure 8:
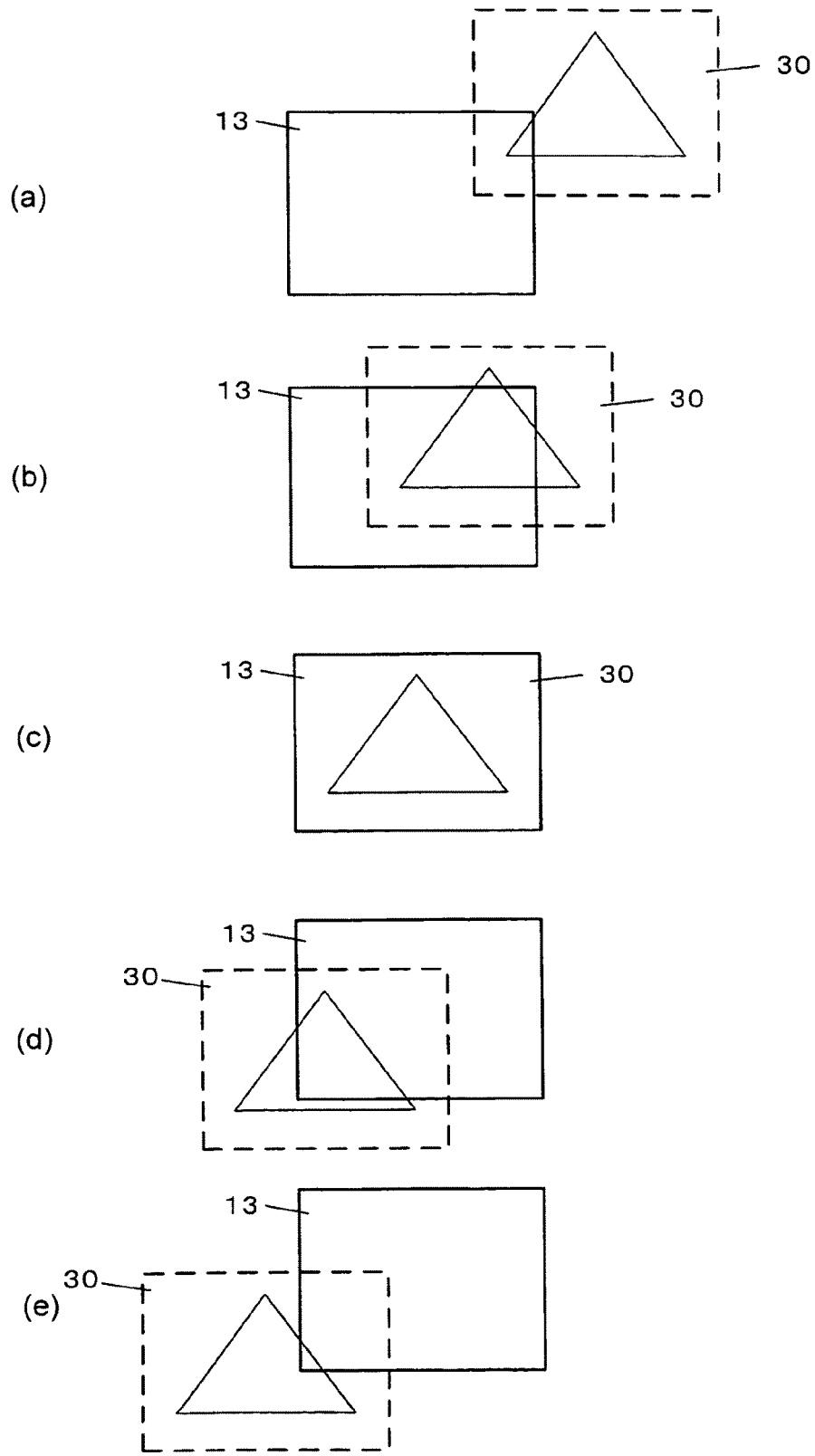
FIG. 8 is a figure showing an example of a replay image displayed by sliding replay.

FIG. 8 shows an example of a replay image that is displayed by sliding replay. If, for example, a movement vector has been recorded due to a through image such as explained with reference to FIG. 6, then, as shown in FIGS. 8(a) through (e), in order to match this movement vector, the photographic image 30 in which the photographic subject 21 is photographed is shifted upon the monitor 13 so as to be displayed as sliding. At this time, under control of the control circuit 5, by reading out the image data for the portion of the photographic image 30 that overlaps the monitor 13 from the recording medium 12, and by sequentially outputting it to the display control circuit 14 while changing its display position, sliding display of the photographic image 30 upon the monitor 13 can be performed. It would also be acceptable to arrange to change the speed of the sliding display at this time, according to the speed of the movement of the photographic subject specified by the movement vector. Moreover, it would also be acceptable to arrange for the photographic image 30 to be shifted in the opposite direction.

By performing sliding replay as explained above, on the basis of the photographic image data and the photographic information data recorded upon the recording medium 12, a replay image according to the photographic image is displayed in which is shown the state of the photographic subject in the through images. Due to this, it is possible to provide a dynamic replay display corresponding to the movement of the photographic subject, on the basis of data of the photographic image that is a still image. Accordingly it is possible to show the circumstance of photography when the through images were acquired in the replay image that is displayed corresponding to the photographic image, so that it is possible to implement display of a replay image that is thoroughly realistic.

It should be understood that although, in the above description, an example was explained of performing sliding replay by utilizing photographic information data based upon the movement vector, it would also be possible to perform similar sliding replay by utilizing photographic information data based upon camera movement information. In other words, if camera movement information has been acquired in the step S350 of FIG. 3, and photographic information data based upon the details thereof has been recorded upon the recording medium 12 together with the photographic image data obtained by the main photography, then it would be possible to determine the shifting direction of the photographic field from this camera movement information. Since, if it is supposed that the photographic subject is stationary, the photographic subject shifts relatively in the direction opposite to the shift direction of the photographic field determined in this manner, accordingly it is possible to perform sliding replay according to the shift direction of the photographic subject.

Furthermore, it would also be acceptable to additionally provide a blurring effect, in other words a shaded or flowing effect, upon the main photographic subject portion in the photographic image, or upon its background portion, corresponding to the movement of this photographic subject, or to movement of the camera. By doing this, it is possible to perform replay display with even higher realism.

Next, firework replay that is performed on the basis of the movement vector in the photographic information when the firework photographic mode was set during the main photography will be explained. If photographic information data is recorded upon the recording medium 12 on the basis of the movement vector acquired in the step S250 of FIG. 3, and when in the step S440 of FIG. 4 a command is issued for replay of an image for which the firework photographic mode is set and photography is performed, then firework replay is performed. In this firework replay, replay display is performed while changing a portion of the photographic image so as to recreate the movement of the fireworks.

Figure 9:
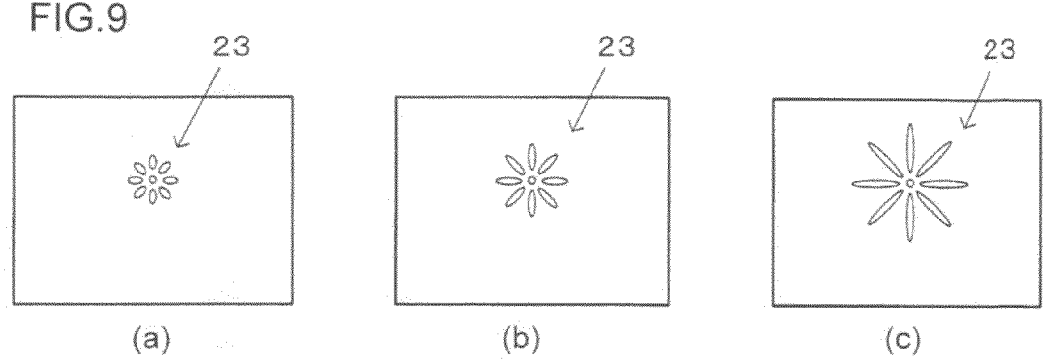
FIG. 9 is a figure showing an example of a replay image displayed by firework replay.

FIG. 9 shows an example of a replay image that is displayed by firework replay. In firework replay, as shown in FIGS. 9(a) through (c), a firework 23 that has been photographed as a photographic subject is displayed dynamically by matching the firework 23 to the movement vector. In other words, if a movement vector calculated from the through images due to trajectories of bright spots of the firework 23 is recorded as the photographic information data, then replay display is performed so as to change the lengths of the bright regions along these trajectories recorded in the photographic image of the main photography. By doing this, images as shown in FIGS. 9(a) through (c) are successively replayed and displayed. It should be understood that, at this time, the photographic image of the main photography might be any one of FIGS. 9(a) through (c). Or, provided that the firework 23 is photographed as the photographic subject, some other photographic image may also be acceptable.

By performing firework replay as explained above, on the basis of the photographic image data and the photographic information data recorded upon the recording medium 12, a replay image according to the photographic image is displayed in which is shown the state of the photographic subject (fireworks) in the through images. Due to this, it is possible to display a photographic image of fireworks dynamically, on the basis of data of the photographic image that is a still image. Accordingly it is possible to show the circumstance of photography when the through images for the fireworks that were the photographic subject were acquired in the replay image that is displayed corresponding to the photographic image, in a similar manner to the case described previously of sliding replay, so that it is possible to implement display of a replay image that is thoroughly realistic. Moreover, it is possible to reduce the amount of data in the recorded photographic image, as compared to the case of video photography. It should be understood that it would also be acceptable to arrange to perform a similar type of replay display for a photographic subject other than fireworks.

Next, illumination replay that is performed on the basis of blink information in the photographic information data when the illumination photographic mode was set during the main photography will be explained. If photographic information data is recorded upon the recording medium 12 on the basis of blink information acquired in the step S270 of FIG. 3, and when in the step S470 of FIG. 4 the illumination photographic mode is set, then illumination replay is performed. In this illumination replay, replay display is performed while blinking a portion of the photographic image so as to recreate the blinking operation of the illumination.

For example, let it be supposed that through images as shown in the previously described FIGS. 7(a) through (e) have been acquired, and the photographic subject 22 has been photographed. In this case, blinking operation like that of FIGS. 7(a) through (e) is recreated in the replay image, on the basis of the position, the luminance, the blinking period and the like of the photographic subject 22, each of which is recorded as blink information. It should be understood that, if there are a plurality of blinking portions in the photographic subject, then the differences in the timings of these blinking portions are recreated on the basis of the phase information recorded as the blink information. Furthermore, it would also be possible to recreate successive changes of luminance or emitted color, on the basis of the blink information.

By performing illumination replay as explained above, on the basis of the photographic image data and the photographic information data recorded upon the recording medium 12, a replay image according to the photographic image is displayed in which is shown the state of the photographic subject (an illumination) in the through images. Due to this, it is possible to provide a replay display corresponding to the blinking operation of the illumination dynamically, on the basis of data of the photographic image that is a still image. Accordingly, in a similar manner to the cases described previously of sliding replay and firework replay, it is possible to show the circumstance of photography when the through images for the illumination that was the photographic subject were acquired in the replay image that is displayed corresponding to the photographic image, so that it is possible to implement display of a replay image that is thoroughly realistic. It should be understood that it would also be acceptable to arrange to perform a similar type of replay display for a photographic subject other than an illumination.

Next, zoom changing replay that is performed on the basis of the details of focal length change information in the photographic information data will be explained. When focal length change information is acquired in the step S290 of FIG. 3, photographic information data on the basis of the details thereof is recorded upon the recording medium 12 in correlation with the photographic image data obtained by the main photography, as previously described. With zoom changing replay, the photographic image is replayed and displayed while being magnified or reduced in size, to match the state of zoom changing specified by this focal length change information.

Figure 10:
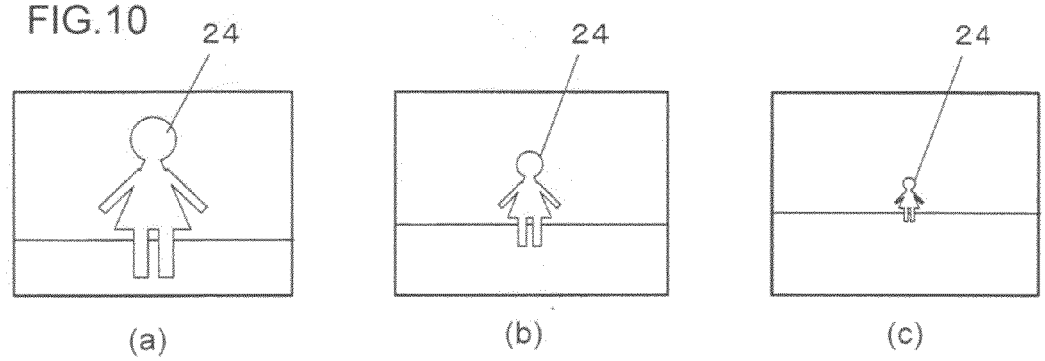
FIG. 10 is a figure showing an example of a replay image displayed by zoom change replay.

FIG. 10 shows an example of a replay image that is displayed by zoom changing replay. With this zoom changing replay, as shown in FIGS. 10(a) through (c), the photographic subject 24 is displayed as gradually shrinking. In other words, if a zoom changing state during acquisition of the through images is recorded as the photographic image data, then replay display is performed while changing the magnification ratio of the photographic image of the main photography, to match this zoom changing. Due to this, images are successively replayed and displayed as shown in FIGS. 10(a) through (c).

It should be understood that, in order to perform zoom changing replay as described above, it is necessary for a photographic image that is to the wide angle side to be photographed by the main photography, as in FIG. 10(c). In other words, if photographic image data as in FIG. 10(c) is recorded upon the recording medium 12, then a replay image as shown in FIG. 10(a) is initially displayed in which a portion of this image data is magnified. Thereafter, replay images as in (b) and (c) are sequentially displayed while gradually reducing the magnification ratio.

Or it would also be possible to arrange, on the basis of the photographic image data recorded upon the recording medium 12, to display the photographic subject 24 upon the monitor 13 while gradually magnifying it, by initially displaying a replay image on the wide angle side as shown in FIG. 10(c), and thereafter displaying replay images like those of (b) and (a) sequentially. Or, it would also be possible to arrange initially to display a replay image that is to the tele side, like that of FIG. 10(a), as shrunk down within one portion of the screen, and thereafter to display this replay image as gradually becoming larger. If this is done, then it is possible to display the photographic subject 24 upon the monitor 13 while gradually increasing its size to match the state of zoom changing specified by the focal length change information, even though a wide angle side replay image as shown in FIG. 10(c) is not recorded upon the recording medium 12.

Next, aperture changing replay that is performed on the basis of aperture change information in the photographic information data will be explained. When aperture change information is acquired in the step S310 of FIG. 3, photographic information data on the basis of the details thereof is recorded upon the recording medium 12 in correlation with the photographic image data obtained by the main photography, as previously described. With aperture changing replay, the replay display is performed while changing the blurring state of the background portion of the photographic image, to match the state of change of the aperture specified by this aperture change information. This type of change of the blurring state may, for example, be implemented by the coefficient of a digital low pass filter being changed by the data processing circuit 10.

Figure 11:
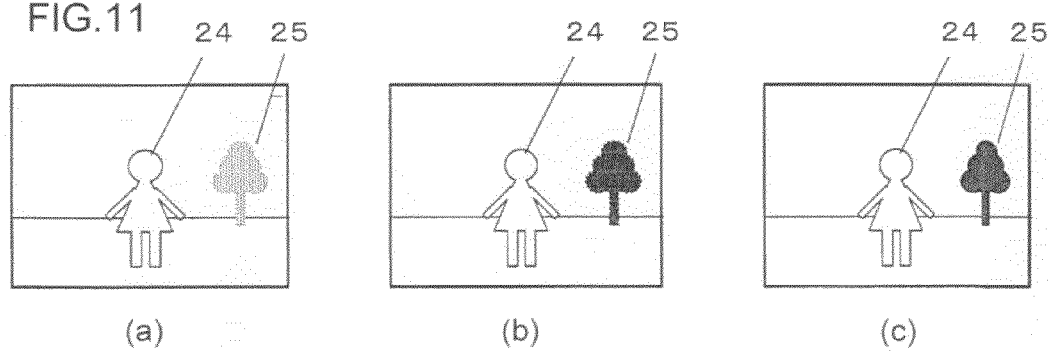
FIG. 11 is a figure showing an example of a replay image displayed by aperture change replay.

FIG. 11 shows an example of a replay image that is displayed by aperture changing replay. With this aperture changing replay, as shown in FIGS. 11(a) through (c), while the main photographic subject 24 is displayed just as it is, the background photographic subject 25 is displayed while gradually becoming clearer from a blurred state. In other words, if an aperture change state during acquisition of the through images is recorded as the photographic image data, then replay display is performed while changing the blurring state of the background portion of the photographic image obtained during the main photography, i.e. of the portion with the main photographic subject 24 excluded, so as to match this aperture change. Due to this, images are successively replay displayed as shown in FIGS. 11(a) through (c).

It should be understood that, in order to perform aperture changing replay as described above, it is necessary for a photographic image with little background blurring to be photographed by the main photography, as in FIG. 11(c). In other words, when photographic image data as in FIG. 11(c) is recorded upon the recording medium 12, then a replay image like that shown in FIG. 11(a) is displayed in which the background portion thereof is initially blurred. Thereafter, replay images as in (b) and (c) are sequentially displayed while gradually reducing the amount of blurring. Or it would also be acceptable, in a similar manner to zoom changing replay, to arrange initially to display a replay image like that of FIG. 11(c) on the basis of the photographic image data, and thereafter, by sequentially displaying replay images like (b) and (a), to continue display upon the monitor 13 while gradually blurring the background portion.

Now, since the background portion of the photographic image is blurred as described above, it is necessary to distinguish the main photographic subject in the photographic image. Distinguishing this main photographic subject may, for example, be performed according to the setting of the focus detection area. In other words, when performing auto focus operation during acquisition of the through images, a focus detection area is set in order to detect the focus state of the photographic lens 2. It is considered that the image portion corresponding to this focus detection area that has been set is one portion of the main photographic subject region. Accordingly, positional information for the focus detection area that is set is recorded during the main photography along with the photographic image, and it is possible to distinguish the position of the main photographic subject region by reading out this positional information for the focus detection area.

Furthermore, image characteristic values around the image portion corresponding to the position of the focus detection area that has been set is calculated from its color or texture or the like, and the range of the region of the main photographic subject is distinguished on the basis of the result of this calculation. For example, the photographic image may be divided into a plurality of blocks, and a histogram of the image characteristic values may be calculated for within each of these blocks. If this histogram exhibits unimodality, in other words if the portion where the pixel characteristic values bunch together is one spot within the block, then it is decided that this block is the same photographic subject region. On the other hand, if the histogram exhibits multimodality, in other words if the portion where the pixel characteristic values bunch together is two or more spots within the block, then it is decided that this block consists of a plurality of photographic subject regions. In this case, the block is further subdivided, and similar processing to that described above is repeated until the histograms exhibit unimodality.

In addition to processing such as that explained above, for example, a portion that exhibits the characteristics of a human face may be determined to be a face region, and a portion below that portion may be determined to be a body region. By doing this, it is possible to determine the range of the main photographic subject region. It should be understood that furthermore, at this time, it would also be acceptable to arrange to decide upon regions that are hair portions or the like. By doing this, it is possible to distinguish the main photographic subject.

Or, it would also be acceptable to use a method such as the following, as a different method for distinguishing a main photographic subject of the type described above. That is, when changing the aperture during acquisition of the through images, each of the through images is divided into small blocks, and frequency analysis of these blocks is performed along with the change of aperture. And, on the basis of the results of this frequency analysis, those regions with few changes of frequency are determined to be the main photographic subject region. It would also be acceptable, by recording information during photography about the main photographic subject region that has been decided in this manner together with the photographic image, to arrange for it to be possible to distinguish the main photographic subject during replay display of a photographic image.

It should be understood that, when performing aperture changing replay such as explained above, it is desirable not to make the degree of blurring of the background portion with respect to the main photographic portion change abruptly, but rather to make it change evenly. In other words, the degree of blurring is reduced closer to the main photographic subject, and is increased further from the main photographic subject. If this is done, it is possible to replay and display the photographic image in a naturally blurred state.

Next, focus changing replay that is performed on the basis of the details of focus change information in the change data will be explained. When focus change information is acquired in the step S330 of FIG. 3, photographic information data on the basis of the details thereof is recorded upon the recording medium 12 in correlation with the photographic image data obtained by the main photography, as previously described. With focus changing replay, the replay display is performed while changing the blurring state of the entire photographic image, to match the state of change of the focus specified by this focus change information.

Figure 12:
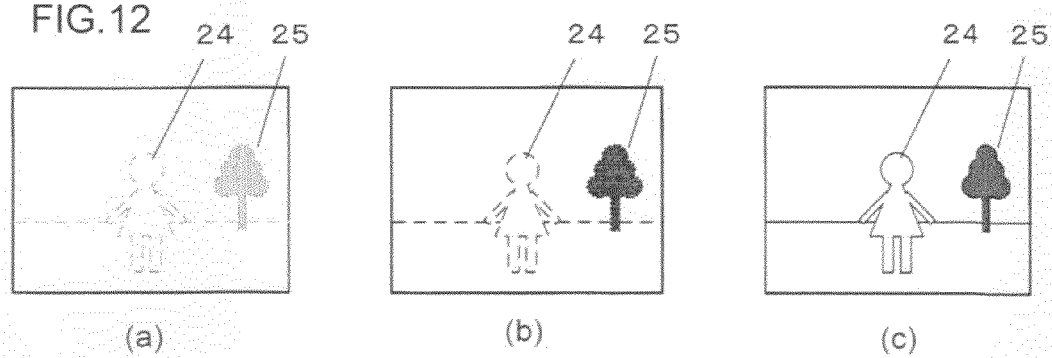
FIG. 12 is a figure showing an example of a replay image displayed by focus change replay.

FIG. 12 shows an example of a replay image that is displayed by focus changing replay. With this focus changing replay, as shown in FIGS. 12(a) through (c), the main photographic subject 24 and the background photographic subject 25 are displayed while gradually becoming clearer from a state in which they are blurred. In other words, if a focus changing state during acquisition of the through images is recorded as the photographic image data, then replay display is performed while changing the blurring state of the entire photographic image obtained during the main photography, so as to match this focusing change. Due to this, images are successively replayed and displayed as shown in FIGS. 12(a) through (c). This type of change of the blurring state may, for example, be implemented by the coefficient of a digital low pass filter being changed by the data processing circuit 10.

It should be understood that, in order to perform focus changing replay as described above, it is necessary for a photographic image towards the well-focused side to be photographed by the main photography, as in FIG. 12(c). In other words, when photographic image data as in FIG. 12(c) is recorded upon the recording medium 12, then a replay image like that shown in FIG. 12(a) is displayed in which the entirety of this photographic image is initially blurred. Thereafter, replay images as in (b) and (c) are sequentially displayed while gradually reducing the amount of blurring. Or it would also be acceptable, in a similar manner to zoom changing replay or aperture changing replay, to arrange initially to display a replay image like that of FIG. 12(c) that is towards the well-focused side on the basis of the photographic image data, and thereafter, by sequentially displaying replay images like (b) and (a), to continue display upon the monitor 13 while gradually blurring the entire photographic image.

Or, it would also be acceptable to arrange to perform the zoom changing replay, aperture changing replay, and focus changing replay explained above on the basis of photographic information data that specifies the state of the photographic subject in the through images. For example, change of the size of the photographic subject in the through images when the focal length is changed may be obtained from the through images, and this may be recorded upon the recording medium 12 as photographic information. When the photographic image is to be replayed, the change of the size of the photographic subject is acquired by referring to this photographic information, and the photographic image is replayed and displayed while magnifying or shrinking it according thereto. Due to this, it is possible to perform zoom changing replay as previously described. Furthermore, for example, change of the blurring state of the through images when the aperture or the focal adjustment state has been changed may be obtained from the through images, and this is recorded as photographic information upon the recording medium 12. And, when the photographic image is to be replayed, the change of the blurring state is acquired by referring to this photographic information, and the photographic image is replayed and displayed while changing the blurring state of all or a part thereof according thereto. Due to this, it is possible to perform aperture changing replay and focus changing replay as previously described.

By performing the zoom changing replay, the aperture changing replay, or the focus changing replay explained above, upon the basis of the photographic image data and the photographic information data recorded upon the recording medium 12, a replay image according to the photographic image is displayed in which the change of setting of the imaging device during acquisition of the through images is reflected. Due to this, it is possible to perform dynamic replay display corresponding to the change of setting of the imaging device, on the basis of data of the photographic image that is a still image. Accordingly, in a similar manner to the sliding replay, firework replay, and illumination replay described previously, it is possible to exhibit the circumstance of photography when the through images were acquired in the replay image that is displayed according to the photographic image, so that display of a replay image that has excellent realism is implemented.

Next, oscillatory movement replay that is performed on the basis of oscillatory movement information for the photographic subject acquired as photographic information will be explained. When oscillatory movement information is acquired in the step S365 of FIG. 3, and in the next step S370 a background image is acquired, then, as previously described, on the basis of these details, photographic information data is recorded upon the recording medium 12 in correlation with the photographic image data obtained by the main photography. With oscillatory movement replay, display is performed while changing at least one of the position and the shape of the photographic subject in the replay image according to the oscillatory movement of the photographic subject as specified by this oscillatory movement information.

Figure 13:
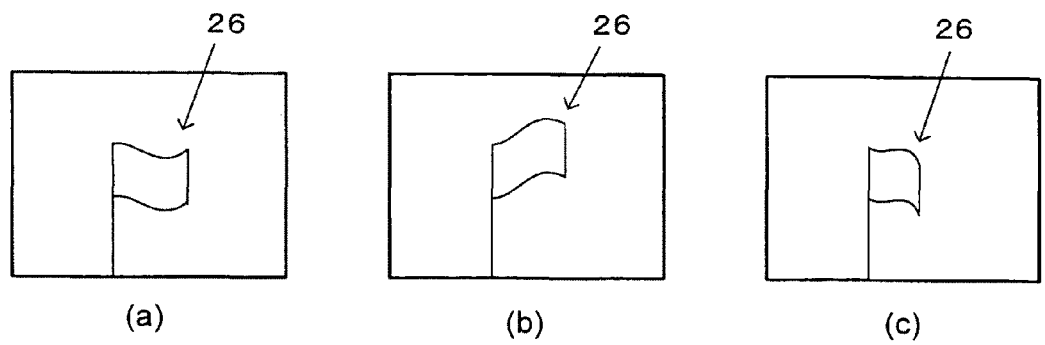
FIG. 13 is a figure showing an example of a replay image displayed by oscillatory movement replay.

FIG. 13 shows an example of a replay image that is displayed by oscillatory movement replay. Here, an example is shown of a replay image when a flag that is waving in the wind has been photographed as the photographic subject. In oscillatory movement replay, as shown in FIGS. 13(a) through (c), the shape of the photographic subject 26 is displayed while changing it along with time. In other words, the photographic subject 26 is extracted from the photographic image, and, by performing predetermined image processing upon this image of the photographic subject 26 that has thus been extracted, the photographic subject 26 is displayed while being dynamically deformed. The manner and the period in which the shape is changed at this time may be determined upon the basis of the details of the oscillatory movement information that was acquired from the through images as photographic information.

Furthermore, when performing oscillatory movement replay as described above, the background image that was acquired as photographic information is displayed in the background of the photographic subject 26. In other words, when the photographic subject 26 is extracted from the photographic image and is deformed, a blank appears at a portion of the photographic image due to this deformation. By embedding in this blank portion a background image that was partly cut out from a through image, it is ensured than no blank portion appears in the replay image. It should be understood that, if the resolutions of the through images and the photographic image are different, then the background image is interpolated or compressed according to this difference of resolutions.

In the example of FIG. 13 explained above, while the shape of the photographic subject 26 changed, its position did not change. However, if the photographic subject shifts while executing oscillatory movement, such as for example when petals or leaves flutter down or the like, it would also be acceptable to change the position of the photographic subject during oscillatory movement replay. Or, if only the position of the photographic subject changes but its shape does not change, that would also be acceptable. In other words, in oscillatory movement replay, at least one of the position and the shape of the photographic subject is changed while being displayed in the replay image, according to the oscillatory movement of the photographic subject specified by the photographic information. Along with this, the background is displayed when at least one of the position and the shape of the photographic subject has been changed on the basis of the background image from which a portion of the through image has been cut out.

Next, successive replay that is performed on the basis of the details of the movement vector in the photographic information will be explained. Successive replay is performed according to a user instruction or the like when a movement vector has been acquired in the step S250 of FIG. 3, and photographic information data based upon this movement vector is recorded upon the recording medium 12 in correlation with this photographic image data. In this successive replay, the photographic subject is displayed in each of a plurality of different positions in the replay image according to the movement of the photographic subject as specified by the photographic information. By doing this, the replay image expresses an effect that visually feels similar to that during long time period exposure or during sequential photography.

Figure 14:
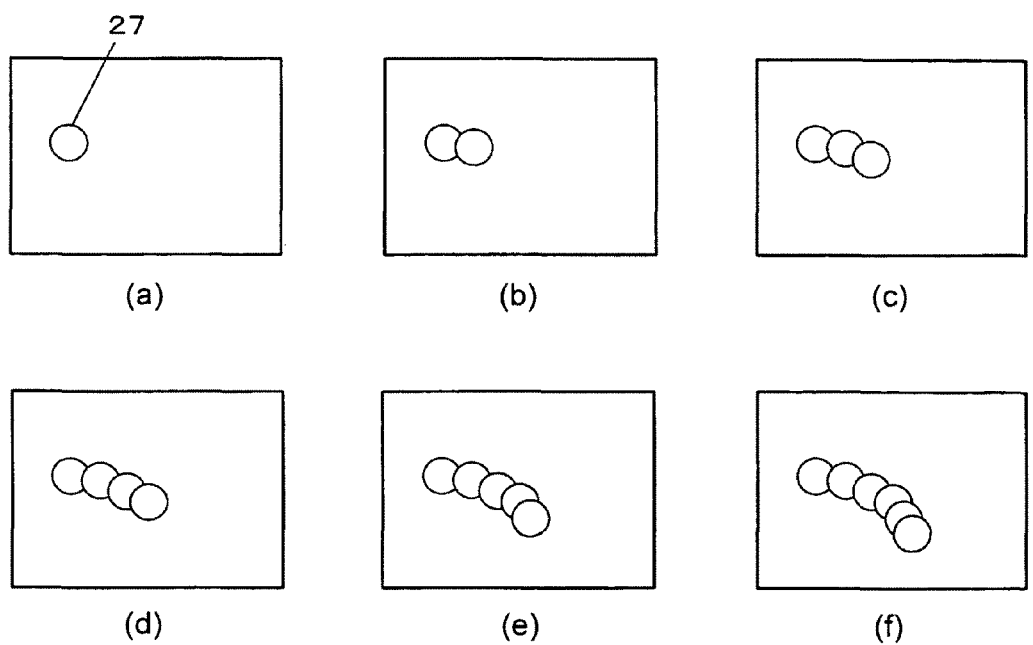
FIG. 14 is a figure showing an example of a replay image displayed by successive replay.

FIG. 14 shows an example of a replay image that is displayed by successive replay. In this successive replay, the images of FIGS. 14(a) through (f) are displayed while being sequentially changed over at a predetermined period. By displaying the photographic subject 27 at a plurality of different discrete positions in the replay image in this manner, the trajectory of the photographic subject 27 is conveyed to the user. Or it would also be acceptable, not to display the images of FIGS. 14(a) through (f) sequentially, but rather to display a replay image like that of FIG. (f), only after having performed the superposition.

It should be understood that the position of the photographic subject 27 in the photographic image could be any one of the positions shown in FIG. 14(f). Moreover, it would also be acceptable to arrange, not to display the position of the photographic subject 27 in a discrete manner, but rather to make the photographic subject 27 shift in the replay image. It is desirable for this type of successive replay to be performed for a photographic subject whose photographed shape does not change while it is shifting, such as, for example, a spherical photographic subject such as a ball or the like, an automobile that crosses in front of the imaging device, or the like.

During successive replay as described above, it would also be acceptable to arrange to forecast the positions of the photographic subject during periods in which no through image is acquired, in other words before and after the preparatory photography, on the basis of the movement vector, and to display the photographic subject in these forecast positions. Furthermore it would also be acceptable to arrange to implement a replay image display that is even more realistic, by performing audio recording when a movement vector is detected from the through images, and by replaying and outputting this recorded audio during the successive replay of the photographic image in a matching manner.

Next, blink correction replay that is performed on the basis of eye images acquired as photographic information will be explained. When one or more eye images is acquired in the step S380 of FIG. 3, photographic information data on the basis of the details thereof is recorded upon the recording medium 12 in correlation with the photographic image data obtained by the main photography, as previously described. In blink correction replay, if a person is present in the photographic image who is blinking his eye, then replay display is performed while replacing a portion of the photographic image with an image of an eye.

Figure 15:
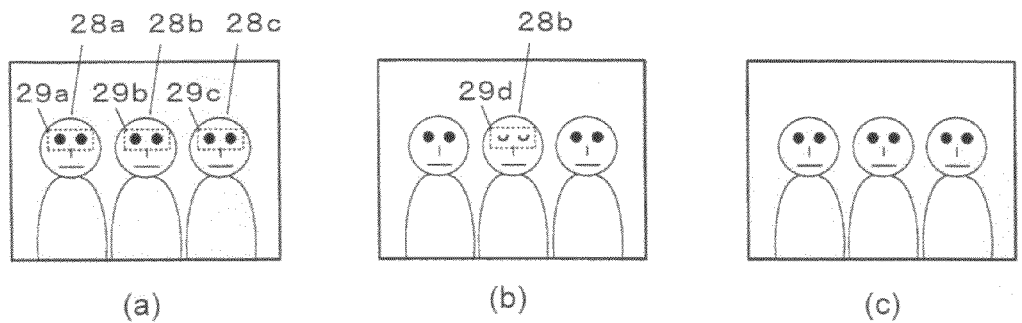
FIG. 15 is a figure showing an example of a replay image displayed by blink correction replay.

FIG. 15 shows an example of a replay image that is displayed by blink correction replay. It will be supposed that, during the preparatory photography that is performed before or after the main photography, as for example shown in FIG. 15(a), a through image has been acquired in which three people 28a through 28c are photographed. At this time, eye images 29a through 29c for these three people are cut out from this through image, and are acquired as photographic information.

Moreover, it will be supposed that the main photography has been performed while the person 28b was blinking his eyes, so that a photographic image as shown in FIG. 15(b) has been recorded upon the recording medium 12. In this type of case, in blink correction replay, display is performed while replacing the portion of the photographic image shown by the reference symbol 29d with the eye image 29b acquired as the photographic information. As a result, a replay image as shown in FIG. 15(c) is displayed, in which the person 28b is not blinking his eyes.

It should be understood that it would also be acceptable for the portion to be replaced in the photographic image to be some portion other than eyes. For example, if the line of sight or the orientation of a face is not appropriate, then it would be acceptable to arrange to perform replay display while replacing this portion with an image cut out from a through image. Provided that a portion that is considered to be a subject for replacement is cut out from the through image during the preparatory photography, and is acquired as photographic information, any portion may be taken as being such a subject for replacement.

Next, shake correction replay that is performed on the basis of the details of the movement vector in the photographic information will be explained. Shake correction replay is performed when, in a photographic image in which a moving photographic subject is photographed, shake of this photographic subject takes place. It should be understood that whether or not shake of this photographic subject is taking place, is decided on the basis of the movement vector acquired in the step S250 of FIG. 3, and on the basis of the shutter speed during photography. In other words, when performing replay display of the photographic image, a decision is made as to whether or not the photographic subject is shaken in the photographic image, on the basis of movement of the photographic subject specified by the movement vector acquired as the photographic information. And, if it has been decided that the photographic subject is shaken, then the shake of the photographic subject in the replay image is corrected by performing shake correction replay.

Figure 16:
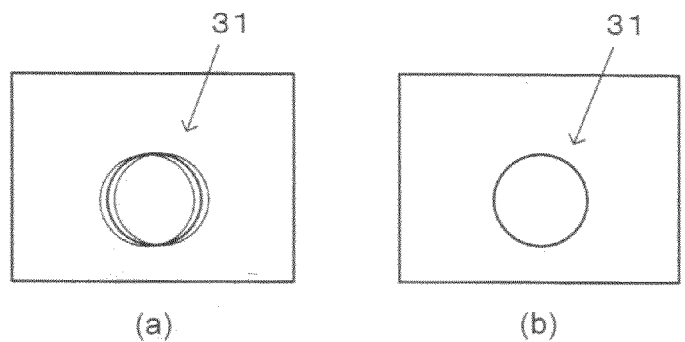
FIG. 16 is a figure showing an example of a replay image displayed by shake correction replay.

FIG. 16 shows an example of a replay image that is displayed by shake correction replay. For example, suppose that the photographic image shown in FIG. 16(a) is acquired by the main photography, and is recorded upon the recording medium 12. A photographic subject 31 is recorded in this photographic image as shaken. When shake correction replay is performed for this photographic image, the shake of the photographic subject 31 is corrected, and a replay image as shown in FIG. 16(*b*) is displayed. It should be understood that this shake correction of the photographic subject 31 is performed by some predetermined image processing method. For example, shake correction may be performed by leaving a center portion of the photographic subject 31 in the shaking direction while deleting a range from this center portion that corresponds to the shake amount, and interpolating the image in the deleted portion on the basis of the pixel values around it. At this time, it would be also acceptable to accentuate the edges of the center portion, or to cut out the interpolated image from the through image. It would also be acceptable to arrange to perform shake correction by some other method.

Next, night scene replay that is performed on the basis of the background image acquired as the photographic information during night scene photography will be explained. When the background image is acquired in the step S390 of FIG. 3, then photographic information data on the basis of the contents thereof is recorded upon the recording medium 12, as previously described, in correlation with the photographic information data obtained by the main photography. In night scene replay, replay display is performed while replacing a portion of the background that has been lost in the photographic image.

Figure 17:
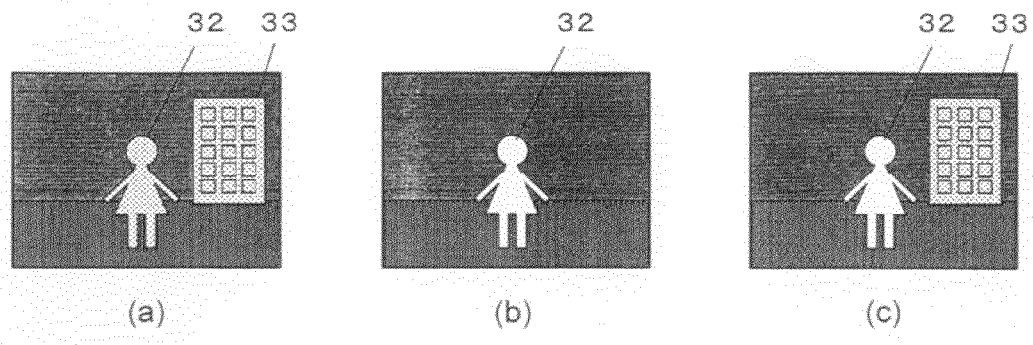
FIG. 17 is a figure showing an example of a replay image displayed by night scene replay.

FIG. 17 shows an example of a replay image that is displayed by night scene replay. It will be supposed that, during the preparatory photography that is performed before or after the main photography, as for example shown in FIG. 17(*a*), a through image has been acquired in which a photographic subject 32 and a background 33 are photographed. At this time, an image of the background 33 is cut out from a through image, and is acquired as photographic information.

Furthermore, the photographic subject 32 is illuminated by a flash being emitted during the main photography, so that a photographic image like that shown in FIG. 17(*b*) is recorded upon the recording medium 12. In this photographic image, due to having adjusted the aperture and the shutter speed to match the brightness of the photographic subject 32 that was illuminated during the main photography, the background 33, which is of relatively low luminance, can no longer be seen. In this type of case, during night scene replay, display is performed while replacing a portion of the photographic image with the image of the background 33 that was acquired as photographic information. As a result a replay image like that shown in FIG. 17(*c*) is displayed, in which the background 33 is photographed. It would also be acceptable to perform this display while lowering the luminance of the image of the background 33.

It should be understood that it would also be acceptable to arrange for not only the background during night scene photography, but any element of the through image to be the subject of cutting out, provided that it is an element that is not recorded in the photographic image, although it is shown in the through image. In other words, it would be possible to take any type of portion as the subject for replacement, provided that, in a similar manner to that described above, it is cut out from a through image during the preparatory photography, and is acquired as photographic information.

By performing oscillatory movement replay or successive replay as explained above, it is possible to implement display of a replay image that has realism, and in which the circumstance of photography when acquiring the through images is expressed. Moreover, by providing shake correction replay, it is possible to correct shake of the photographic subject in the replay image. Furthermore, with oscillatory movement replay, blink correction replay, or night scene replay, it is possible to display the replay image while interpolating, from the through images, information that was lost during acquisition of the photographic image.

7. Deleting a Photographic Image

Next, the operation by this imaging device to perform deletion of a photographic image will be explained. On the basis of the information about the results of intruding object detection recorded upon the recording medium 12 in the step S700 of FIG. 5, this imaging device decides whether or not an intruding object was detected during photography, and extracts a photographic image that is a candidate for deletion (i.e. a deletion candidate image) according to the result of this decision. And, if the operator of the imaging device has selected deletion for this deletion candidate image that has been extracted, then this deletion candidate image is deleted and eliminated from the recording medium 12. By doing this, the photographic image is deleted.

Figure 18:
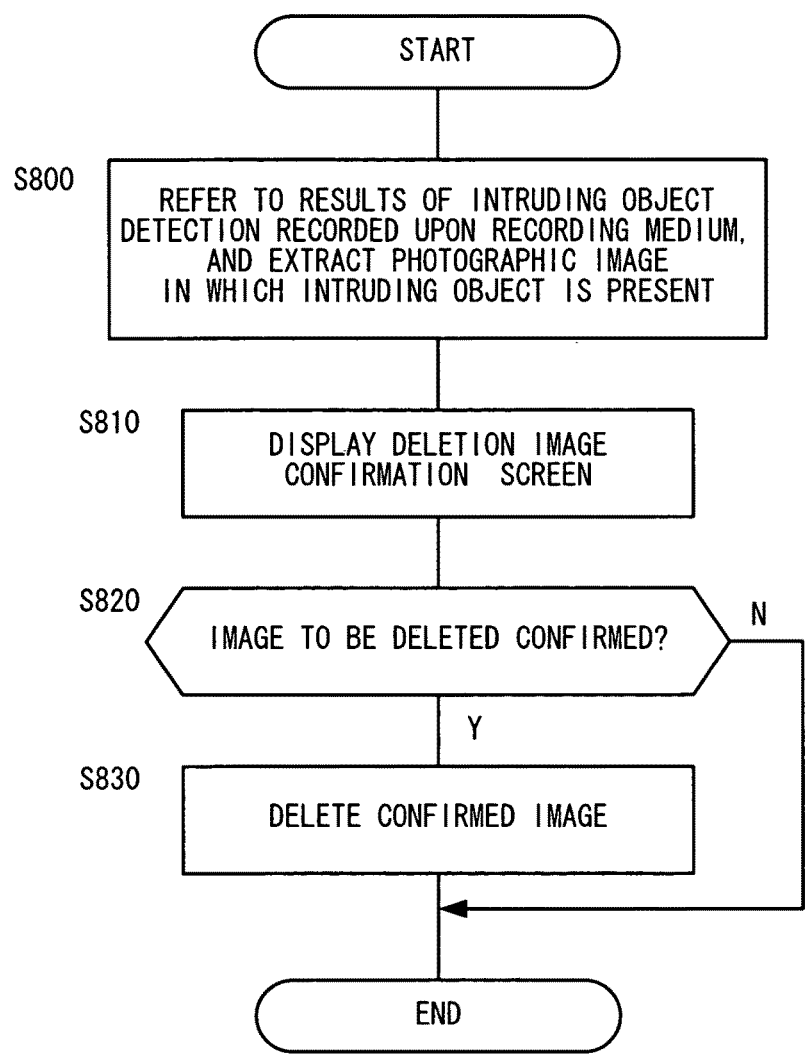
FIG. 18 is a flow chart of processing executed when extracting and deleting a photographic image.

FIG. 18 is a flow chart that is executed by the control circuit 5 when extracting and deleting a photographic image, as explained above. In a step S800, the control circuit 5 refers to the information about the results of intruding object detection recorded upon the recording medium 12, and extracts and replays, from among the photographic images recorded upon the recording medium 12, a photographic image in which an object is present intruding into the photographic field. By this processing, a photographic image in which an intruding object is photographed is extracted as a deletion candidate image, and this deletion candidate image is displayed upon the monitor 13.

In a step S810, the control circuit 5 displays a deletion image confirmation screen, for confirming whether or not the deletion candidate image that has been replayed and displayed by the step S810 should be deleted from the recording medium 12. By the operator operating the operation members 7 upon this deletion image confirmation screen, he is able to select whether or not the deletion candidate image that has been replayed and displayed is to be deleted. Or, if a plurality of deletion candidate images were extracted in the step S800 and displayed upon the monitor 13, he is able to select any of this plurality of deletion candidate images as an image to be deleted.

In a step S820, the control circuit 5 makes a decision as to whether or not the image to be deleted has been confirmed upon the deletion image confirmation screen displayed in the step S810. If the image to be deleted has been confirmed, then the flow of control proceeds to a step S830, in which this image is deleted from the recording medium 12. At this time, the data for the photographic image that has been selected as the image to be deleted, and the photographic information data and the result of intruding object detection that were recorded in correlation with this photographic image data, are deleted from the recording medium 12. When the step S830 has been executed, the control circuit 5 terminates the flow chart of FIG. 18. On the other hand, if in the step S820 the image to be deleted has not been confirmed, then the step S830 is not executed, but rather the flow chart of FIG. 18 is terminated. In this case, deletion of the photographic image is not performed.

It should be understood that, in the explanation above, it was arranged to extract the deletion candidate image on the basis of the information about the results of intruding object detection recorded upon the recording medium 12 in correlation with the photographic image; but it would also be acceptable to arrange to extract the deletion candidate images on the basis of the photographic information data recorded upon the recording medium 12 in correlation with the photographic images. For example it may be detected, on the basis of the movement vector previously described given by the photographic information data, whether or not change of the photographic subject in the through images when the photographic image was acquired is greater than or equal to a predetermined magnitude. And those photographic images may be extracted as deletion candidate images for which the result is that change of the photographic subject greater than or equal to the predetermined magnitude is detected.

By executing deletion of the photographic images as explained above, even if main photography was performed and a photographic images was acquired while intruding objects were intruding into the photographic field, it is still possible to extract this photographic image in which these intruding objects are present in a simple and easy manner, and to delete it. It should be understood that it would also be acceptable to provide a structure in which a "best shot" is selected, in which it is not those photographic images in which an intruding object is present that are extracted, but rather, conversely, it is those photographic images in which no intruding object is present that are extracted.

Figure 19:
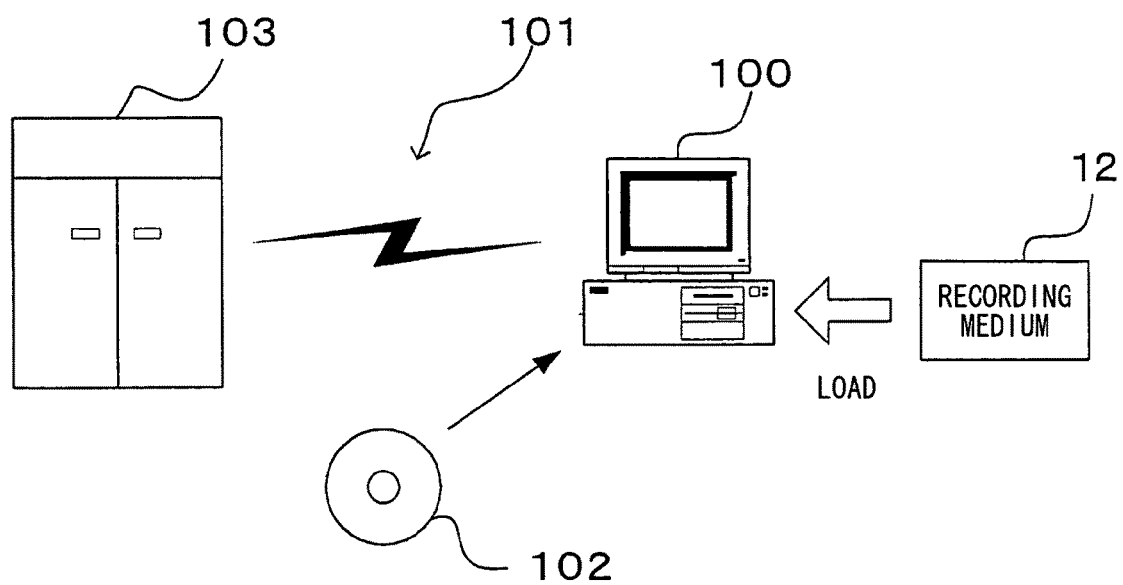
FIG. 19 is a figure showing an example of the use of a personal computer as an image display device.

Furthermore, it would also be acceptable to arrange to perform the replay display of the photographic images and the deletion of the photographic images as explained above, upon some image display device other than this imaging device. In this case, a program related to the type of control described above may be supplied to the image display device via a recording medium such as a CD-ROM or the like, or via an electrical communication line such as the interne or the like. FIG. 19 shows an example of the use of a personal computer as an image display device. The personal computer 100 receives supply of the program via a CD-ROM 102. Or it will also be acceptable to provide the personal computer 100 with a function of connection to a communication line 101, and to arrange to supply the above described program from a server 103. The communication line 101 may be the interne, a communication line for personal computer communication or the like, or a dedicated communication line or the like. The server 103 transmits the program to the personal computer 100 via the communication line 101. In other words, the program is converted to a data signal upon a carrier wave, and is transmitted via the communication circuit 101. In this manner, the program may be supplied as a computer-readable program product in various different formats, such as a recording medium or a carrier wave or the like.

A recording medium 12, upon which the photographic image data, photographic information data, and results of intruding object detection are recorded, is loaded into the personal computer 100 described above. By executing the program that was supplied from the CD-ROM 102 or the server 103, the personal computer 100 reads out the photographic image data and the photographic information data from the recording medium 12, and, as previously described, on the basis of this photographic image data and photographic information data that have been read out, displays replay images according to the photographic images in which the circumstance of photography when the through images were acquired are reflected on a screen. In other words, replay images are displayed upon the screen that reflect the state of the photographic subject in the through images or setting changes of the imaging device during acquisition of the through images. Or the personal computer 100 may perform the flow chart of FIG. 13 by executing a program supplied from the CD-ROM 102 or the server 103. By doing this, those photographic images are extracted and replayed from among the photographic images recorded upon the recording medium 12, in which an intruding object into the photographic field is present. And the screen is displayed for confirming whether or not these photographic images that have been replayed are to be deleted from the recording medium 12.

According to the embodiment described above, the following advantages are obtained.

(1) According to operation by the photographer, the control circuit 5 photographs the photographic subject and acquires a photographic image (the step S680). Before or after acquisition of the photographic image in this manner, the control circuit 5 acquires a through image of the photographic subject by performing preparatory photography (the steps S20 and S80), and thus acquires photographic information related to the circumstance of photography when this through image was acquired (the steps S40 and S100). And it is arranged to record the photographic information and the photographic image that have thus been acquired upon the recording medium 12 in mutual correlation (the step S120). Since this is done, it is possible to utilize the information obtained during acquisition of the through image in the processing for the main photography or the like, which is performed separately from the photography of the through image.

(2) In the step S40 or the step S100, on the basis of the plurality of through images that are acquired in the step S20 or the step S80 over the passage of time, the control circuit 5 acquires the photographic information that specifies the state of the photographic subject in the through images. And, in the step S120, it is arranged to record this photographic information along with the elapsed time. Since this is done, it is possible to acquire the photographic information that specifies the circumstance of photography in an appropriate manner.

(3) In the steps S40 and S100, the control circuit 5 is able to acquire photographic information on the basis of at least one of the movement and the blinking state of the photographic subject in the through images (the steps S250 and S270). Since this is done, when the photographic subject is changing, it is possible to acquire photographic information that specifies the manner of this change in an appropriate manner.

(4) When the replay mode is selected, the data processing circuit 10, the compression/expansion circuit 11, and the display control circuit 14 display a replay image upon the monitor 13 according to the photographic image in which the state of the photographic subject in the through images is reflected, on the basis of the photographic image data and the photographic information data recorded upon the recording medium 12. Or they display a replay image upon the monitor 13 according to the photographic image in which the setting change of the imaging device during through image acquisition is reflected. Since this is done it is possible to display, from the photographic image that has been recorded as a still image, a replay image that has excellent realism.

(5) When the photographic information data recorded upon the recording medium 12 specifies movement of the image of the photographic subject, then it is arranged for the data processing circuit 10, the compression/expansion circuit 11, and the display control circuit 14 to display the replay image while sliding the position of the photographic subject in the replay image, as shown in FIG. 8, according to the movement of the photographic subject as specified by this photographic information data. Since this is done, it is possible to display a replay image in which the movement of the photographic subject is recreated in an appropriate manner.

(6) If the firework photographic mode is set during the main photography, it is arranged for the data processing circuit 10, the compression/expansion circuit 11, and the display control circuit 14 to display the replay image while changing the length of bright spots in the replay image as shown in FIG.

9, according to the movement of the photographic subject as specified by this photographic information data recorded upon the recording medium 12. Since this is done, it is possible to display a replay image in which the movement of a photographic subject such as fireworks or the like is recreated in an appropriate manner.

(7) When the photographic information data recorded upon the recording medium 12 specifies a blinking state of the image of the photographic subject, it is arranged for the data processing circuit 10, the compression/expansion circuit 11, and the display control circuit 14 to display the replay image while blinking a portion of the replay image, as shown in FIG. 7, according to the blinking state of the photographic subject as specified by this photographic information data. Since this is done, in the case of photographing an illumination or the like in which the luminance or the color changes cyclically, it is possible to display a replay image in which this blinking state is recreated.

(8) During successive replay, it is arranged for the data processing circuit 10, the compression/expansion circuit 11, and the display control circuit 14 to display the photographic subject in each of a plurality of different positions within the replay image, as shown in FIG. 14, according to the movement of the photographic subject as specified by the photographic information data. Since this is done it is possible to express, in the replay image, a similar visual feeling to that experienced during long period exposure or sequential photography.

(9) Furthermore, on the basis of movement of the photographic subject specified by the photographic image data, it is arranged for the data processing circuit 10, the compression/expansion circuit 11, and the display control circuit 14 to decide whether the photographic subject is shaken in the photographic image, and, if they have decided that it is shaken, then it is arranged for the shake of the photographic subject to be corrected in the replay image, by performing shake correction replay as shown in FIG. 16. Since this is done, it is possible to display a replay image in which no shake is present, even if the photographic subject is shaken in the photographic image.

(10) When a predetermined condition is satisfied, the control circuit 5 acquires an image in which a portion of the through image has been cut out as the photographic information (the steps S370, S380, and S390). By utilizing this photographic information, it is possible to implement the following replay methods: oscillatory movement replay, blink correction replay, and night scene replay.

(11) If oscillatory movement of the photographic subject is present, then the control circuit 5 further acquires information that specifies this oscillatory movement of the photographic subject in the through images as photographic information (the step S365). Furthermore, by performing oscillatory movement replay as shown in FIG. 13, the data processing circuit 10, the compression/expansion circuit 11, and the display control circuit 14 display the replay image while changing at least one of the position and the shape of the photographic subject in the replay image according to the oscillatory movement of the photographic subject as specified by the photographic information, and also, when at least one of the position and the shape of the photographic subject have changed, display a background based upon an image in which a portion of a through image has been cut out. Since this is done, it is possible to display a replay image that has excellent realism, and in which the way that the photographic subject moves oscillatory is recreated.

(12) Furthermore, when performing blink correction replay as shown in FIG. 15 or night scene replay as shown in FIG. 17, it is arranged for the data processing circuit 10, the compression/expansion circuit 11, and the display control circuit 14 to display a replay image in which a portion of the photographic image is replaced with an image made by cutting out a portion of the preparatory image. Since this is done, it is possible to display information that was lost during acquisition of the photographic image, as interpolated into the replay image.

(13) Furthermore, in the steps S40 and S100, on the basis of change of at least one of the focal length, the aperture, or the focal adjustment state when the through images were acquired, the control circuit 5 is able to acquire photographic information that specifies this change of the setting of the imaging device during through image acquisition (the steps S290, S310, and S330). Since this is done, it is possible to acquire photographic information that specifies the circumstance of photography in an appropriate manner.

(14) When the photographic information data recorded upon the recording medium 12 shows a change of focal length during through image acquisition, it is arranged for the data processing circuit 10, the compression/expansion circuit 11, and the display control circuit 14 to provide display while changing the magnification ratio of the replay image, as shown in FIG. 10, according to this change of the focal length specified by the photographic information data. Since this is done, it is possible to display a replay image in which the change of zoom is recreated.

(15) When the photographic information data recorded upon the recording medium 12 shows a change of aperture during through image acquisition, it is arranged for the data processing circuit 10, the compression/expansion circuit 11, and the display control circuit 14 to provide display while changing the blurring state of the background portion of the replay image, as shown in FIG. 11, according to this change of the aperture specified by the photographic information data. Since this is done, it is possible to display a replay image in which the change of aperture is recreated.

(16) When the photographic information data recorded upon the recording medium 12 shows a change of the focal adjustment state during through image acquisition, it is arranged for the data processing circuit 10, the compression/expansion circuit 11, and the display control circuit 14 to provide display while changing the blurring state of the replay image, as shown in FIG. 12, according to this change of the focal adjustment state specified by the photographic information data. Since this is done, it is possible to display a replay image in which the focusing change is recreated.

(17) When a through image has been acquired before the acquisition of the photographic image by the main photography, the control circuit 5 detects (in the step S620) an object intruding into the photographic field, on the basis of photographic information specifying the movement of the photographic subject, acquired in the step S40. And it is arranged to permit or to prohibit (in the steps S630 and S640) photography of the image of the photographic subject in the step S680, according to the result of this intruding object detection. Since this is done, it is possible to prevent photography from being mistakenly performed when the main photographic subject is being concealed by an intruding object. Or, when the main photographic subject is not concealed, it is possible to prevent the photographic subject from being photographed uselessly in a manner that, in the main photographic image, would be offensive to the eye.

(18) It is arranged for the control circuit 5 (in the step S630) to permit or to prohibit the main photography, on the basis of the intrusion direction into the photographic field or the size of the intruding object that has been detected in the step S620.

Since this is done, it is possible to determine upon the state in which the main photographic subject is being concealed by an intruding object in an appropriate manner, so that it is possible to prevent the main photography in this situation.

(19) It should be understood that, when permitting or prohibiting the main photography in the manner described above, it is arranged for the control circuit 5 to permit the main photography for an intrusion direction that corresponds to movement of the imaging device detected by the shake detection sensor 16. Since this is done, during photography while panning or tilting is being performed, it is possible to prevent photography from being mistakenly prohibited due to the photographic subject that is to be photographed being detected as an intruding object.

(20) It is arranged for the control circuit 5 to record upon the recording medium 12 the result of intruding object detection in the step S620, in correspondence with the photographic image data (the step S700). Since this is done, when reading out the photographic image data from the recording medium 12, it is possible to decide whether or not an intruding object has been detected during photography in a simple and easy manner.

(21) When recording the result of intruding object detection upon the recording medium 12 in correlation with the photographic image data as described above, it is arranged for the control circuit 5, when an intruding object has shifted out of the photographic field before the main photography is performed, to eliminate the result of detecting this intruding object from the subjects of recording. Since this is done, it is possible to eliminate from the subjects of recording a result of detection of an intruding object that has not exerted any influence upon photography.

(22) It is arranged for the control circuit 5 to set the photographic conditions when performing the main photography in the step S680, by performing (in the step S50) setting of the photographic mode on the basis of the photographic information that has been acquired. Since this is done, it is possible to set the optimum photographic conditions to match the photographic subject.

(23) It is arranged for the control circuit 5 to extract and to replay (the step S800), from among the photographic images recorded upon the recording medium 12, a photographic image in which an object is present that is intruding into the photographic field, and to display (the step S810) upon the monitor 13 a screen for confirmation of whether or not this photographic image that has been replayed should be deleted from the recording medium 12. Since this is done, even if the main photography has been performed and a photographic image has been acquired while an intruding object has passed across the photographic field, it is possible to extract and to delete the photographic image in which this intruding object is present in a simple and easy manner.

It should be understood that the embodiment above may also be applied to a recording device. In the case of a recording device, the photographic means may be omitted.

Furthermore when, in the embodiment explained above, an intruding object has been detected during photography of the preparatory images, in other words during photography of the through images, and the result of detection of this intruding object and a movement vector specifying the movement of this intruding object have been recorded upon the recording medium 12 in correlation with the photographic image, it would also be acceptable to arrange to perform cropping processing on the basis of this information.

When performing such cropping processing, the control circuit 5 estimates the position of the intruding object within the main photographic image on the basis of its movement vector recorded upon the recording medium 12, and sets a rectangular region upon the photographic image in which this intruding object is excluded as a cropping region. By displaying upon the monitor 13 the photographic image within this cropping region that has been set as a cropping candidate image, this cropping candidate image is presented to the operator of the imaging device. The operator may confirm this cropping candidate image that has been displayed upon the monitor 13 and select whether to record it upon the recording medium 12, or to execute trimming processing for changing the cropping region.

If the operator has selected the option to record the cropping candidate image upon the recording medium 12, then the control circuit records upon the recording medium 12 information for specifying the cropping region along with the photographic image. Due to this it is arranged for only the portion within the cropping region to be displayed, when replaying the photographic image. Or it would also be acceptable to record the cropping candidate image itself upon the recording medium 12, by cutting out the portion within the cropping region from the photographic image.

On the other hand, if the operator has selected the option to execute trimming processing, then the control circuit 5 performs trimming processing on the basis of operation by the operator, and thereby changes the cropping region. When the cropping region has been confirmed as a result of performing trimming processing in this manner, the control circuit 5 records the photographic image upon the recording medium 12, together with information for specifying this cropping region. Or, the portion within this cropping region may be cut out from the photographic image, and the image after trimming processing may itself be recorded upon the recording medium 12.

It should be understood that it will be acceptable for cropping processing such as that explained above to be performed upon the imaging device directly after the main photography, or alternatively for it to be performed by reading out the photographic image recorded upon the recording medium 12 after the main photography. Or, it would also be acceptable to arrange for the cropping processing to be performed upon some device other than the imaging device.

It should be understood that the embodiment explained above is only one embodiment of the present invention. Accordingly, when interpreting this invention, there is no limitation or constraint with regard to the correspondence relationship between the items described above and the items described in the scope of the Claims. Furthermore, the present invention is not to be considered as being limited to the details described above, provided that the essential characteristics of the invention are not departed from.

The disclosure of the following priority application is herein incorporated by reference: Japanese Patent Application No. 2007-153169 (filed on Jun. 8, 2007).

The invention claimed is:

1. An imaging device, comprising:
 a main photography unit that photographs a photographic subject and acquires a photographic image;
 a preparatory image acquisition unit that performs preparatory photography before and/or after the main photography unit acquires the photographic image, and acquires preparatory images;
 a photographic information acquisition unit that acquires photographic information related to a circumstance of photography when the preparatory images are acquired by the preparatory image acquisition unit;

a recording unit that records the photographic information and the photographic image upon a recording medium in mutual correlation;

an intruding object detection unit that, when preparatory images have been acquired by the preparatory image acquisition unit before acquisition of the photographic image by the main photography unit, detects an intruding object into a photographic field on the basis of the photographic information that is acquired by the photographic information acquisition unit and specifies movement of the photographic subject; and a control unit that permits or prohibits photography by the main photographic unit, according to the result of intruding object detection by the intruding object detection unit.

2. An imaging device according to claim 1, wherein the control unit permits or prohibits photography by the main photographic unit, on the basis of an intrusion direction into the photographic field and/or a size of the intruding object.

3. An imaging device according to claim 2, further comprising a movement detection unit that detects movement of the imaging device; and wherein the control unit permits photography by the main photographic unit, for an intrusion direction of the intruding object into the photographic field due to the movement of the imaging device detected by the movement detection unit.

4. An imaging device according to claim 1, wherein the recording unit further records the result of detection of the intruding object by the intruding object detection unit upon the recording medium in correlation with the photographic image.

5. An imaging device, comprising:

a main photography unit that photographs a photographic subject and acquires a photographic image;

a preparatory image acquisition unit that performs preparatory photography before and/or after the main photography unit acquires the photographic image, and acquires preparatory images;

a photographic information acquisition unit that acquires photographic information related to a circumstance of photography when the preparatory images are acquired by the preparatory image acquisition unit;

a recording unit that records the photographic information and the photographic image upon a recording medium in mutual correlation; and an intruding object detection unit that, when preparatory images have been acquired by the preparatory image acquisition unit, detects an intruding object into a photographic field on the basis of the photographic information that is acquired by the photographic information acquisition unit and specifies movement of the photographic subject; and wherein the recording unit records the result of detection of the intruding object by the intruding object detection unit upon the recording medium in correlation with the photographic image.

6. An imaging device according to claim 4, wherein the recording unit eliminates the result of detection of the intruding object from a subject to be recorded, if the intruding object has shifted out of the photographic field before the main photography unit performs photography.

7. An imaging device according to claim 6, further comprising:

an extraction and replay unit that, from among the photographic images recorded upon the recording medium, extracts and replays a photographic image in which the intruding object into the photographic field is present; and a deletion image confirmation screen display unit that displays a screen for confirmation as to whether or not the photographic image replayed by the extraction and replay unit is to be deleted from the recording medium.

8. An image display device that extracts and replays, from among the photographic images recorded upon the recording medium by an imaging device according to claim 6, a photographic image in which the intruding object into the photographic field is present, and displays a screen for confirmation as to whether or not the replayed photographic image is to be deleted from the recording medium.

9. A non-transitory computer-readable storage medium configured to store a program that causes a computer to execute:

a step of extracting and replaying, from among the photographic images recorded upon the recording medium by an imaging device according to claim 1, a photographic image in which the intruding object into the photographic field is present; and a step of displaying a screen for confirmation as to whether or not the replayed photographic image is to be deleted from the recording medium.

10. A non-transitory computer-readable storage medium configured to store a program that causes a computer to execute:

a step of extracting and replaying, from among the photographic images recorded upon the recording medium by an imaging device according to claim 6, a photographic image in which the intruding object into the photographic field is present; and a step of displaying a screen for confirmation as to whether or not the replayed photographic image is to be deleted from the recording medium.

* * * * *

UNITED STATES PATENT AND TRADEMARK OFFICE
CERTIFICATE OF CORRECTION

PATENT NO.        : 8,587,658 B2  Page 1 of 1
APPLICATION NO.   : 12/451727
DATED             : November 19, 2013
INVENTOR(S)       : Keiichi Nitta et al.

It is certified that error appears in the above-identified patent and that said Letters Patent is hereby corrected as shown below:

In the claims,
  col. 40, line 13, change "claim 6" to --claim 5--;
  col. 40, line 26, change "claim 6" to --claim 5--; and
  col. 40, line 47, change "claim 6" to --claim 5--.

Signed and Sealed this
Eighteenth Day of February, 2014

Michelle K. Lee
*Deputy Director of the United States Patent and Trademark Office*